US010294842B2

(12) United States Patent
Sandou

(10) Patent No.: US 10,294,842 B2
(45) Date of Patent: May 21, 2019

(54) ENGINE DEVICE

(71) Applicant: Yanmar Co. Ltd., Osaka-shi, Osaka (JP)

(72) Inventor: Yoshiyuki Sandou, Osaka (JP)

(73) Assignee: YANMAR CO., LTD., Osaka (JP)

( * ) Notice: Subject to any disclaimer, the term of this patent is extended or adjusted under 35 U.S.C. 154(b) by 110 days.

(21) Appl. No.: 15/475,552

(22) Filed: Mar. 31, 2017

(65) Prior Publication Data
US 2017/0204765 A1  Jul. 20, 2017

Related U.S. Application Data

(63) Continuation of application No. PCT/JP2015/077304, filed on Sep. 28, 2015.

(30) Foreign Application Priority Data

Oct. 6, 2014  (JP) .................. 2014-205766

(51) Int. Cl.
*F01N 13/08* (2010.01)
*F01N 3/20* (2006.01)
*B01D 53/94* (2006.01)
*F01N 3/08* (2006.01)
*F01N 3/28* (2006.01)
*F01N 13/18* (2010.01)

(52) U.S. Cl.
CPC .......... *F01N 3/2066* (2013.01); *B01D 53/94* (2013.01); *B01D 53/9431* (2013.01); *B01D 53/9477* (2013.01); *F01N 3/08* (2013.01); *F01N 3/28* (2013.01); *F01N 13/08* (2013.01); *F01N 13/1838* (2013.01); *F01N 2450/22* (2013.01); *F01N 2470/08* (2013.01); *F01N 2470/18* (2013.01); *F01N 2470/24* (2013.01); *F01N 2570/14* (2013.01); *F01N 2610/02* (2013.01); *F01N 2610/14* (2013.01); *Y02T 10/24* (2013.01)

(58) Field of Classification Search
CPC ........ F01N 1/087; F01N 13/08; F01N 13/141; F01N 13/1805; F01N 13/1838; F01N 2450/22; F01N 2470/18; F01N 2470/24
See application file for complete search history.

(56) References Cited

U.S. PATENT DOCUMENTS

2008/0072576 A1   3/2008  Honda et al.

FOREIGN PATENT DOCUMENTS

| JP | 4605205 B2 | 10/2010 |
|----|------------|---------|
| JP | 4703260 B2 | 3/2011 |
| JP | 2011-99415 A | 5/2011 |

(Continued)

*Primary Examiner* — Jonathan Matthias
(74) *Attorney, Agent, or Firm* — Norton Rose Fulbright US LLP

(57) ABSTRACT

In an engine device having a urea mixing pipe which injects urea water into exhaust gas of an engine, and an SCR case which removes nitrogen oxides in the exhaust gas of the engine, and structured such that an inlet side of the SCR case is connected to an outlet side of the urea mixing pipe, the urea mixing pipe is formed by an outer pipe and an inner pipe having a double pipe structure, the SCR case is formed by an inner case body and an outer case body having a double case structure, an exhaust gas outlet side end portion of the outer pipe is connected to an exhaust gas inlet of the inner case body, and an exhaust gas outlet side end portion of the inner pipe is provided in a protruding manner in an inner portion of the SCR case.

20 Claims, 24 Drawing Sheets

(56) References Cited

FOREIGN PATENT DOCUMENTS

| JP | 5020185 B2 | 6/2012 |
| JP | 2014-151764 A | 8/2014 |
| JP | 2014-159764 A | 9/2014 |

ENGINE DEVICE

CROSS-REFERENCE TO RELATED APPLICATIONS

The present application is a continuation application of International Application No. PCT/JP2015/077304, filed Sep. 28, 2015, which claims priority to Japanese Patent Application No. 2014-205766, filed Oct. 6, 2014. The contents of these applications are incorporated herein by reference in their entirety.

BACKGROUND OF THE INVENTION

The present invention relates to an engine device.

There has been conventionally known a technique of purifying the exhaust gas discharged from the diesel engine by arranging a case inward provided with a diesel particulate filter (hereinafter, refer to as a DPF case), and a case inward provided with a urea selective reducing type catalyst (hereinafter, refer to as an SCR case), as an exhaust gas purification device (an exhaust gas aftertreatment device) in an exhaust channel of the diesel engine, and introducing the exhaust gas to the DPF case and the SCR case (refer, for example, to Japanese Patent No. 4703260, Japanese Patent No. 4605205 and Japanese Patent No. 5020185).

SUMMARY OF THE INVENTION

In the structure having the exhaust gas connection pipe which mixes the urea water into the exhaust gas and connecting the exhaust gas inlet of the SCR case to the exhaust gas connection pipe via a flange such as Japanese Patent No. 4703260 or Japanese Patent No. 4605205, the SCR case can be easily assembled. Further, in the structure in which the exhaust gas connection pipe is formed by the outer pipe and the inner pipe having the double pipe structure such as Japanese Patent No. 5020185, it is possible to prevent the temperature of the exhaust gas supplied to the SCR case from the engine from being lowered.

However, in the case that the exhaust gas inlet of the SCR case is connected to the exhaust gas connection pipe having the double pipe structure via the flange, the flange connection portion of the exhaust gas connection pipe is locally cooled, and the urea crystal lump tends to be created due to the temperature reduction of the inner pipe connection portion. As a result, there is a problem of causing an increase in the exhaust gas resistance.

Accordingly, the present invention aims at providing an engine device which is improved by making a study of these actual conditions.

In order to achieve the object mentioned above, an engine device according to the present invention is an engine device having a urea mixing pipe which injects urea water into exhaust gas of an engine, and an SCR case which removes nitrogen oxides in the exhaust gas of the engine, and structured such that an inlet side of the SCR case is connected to an outlet side of the urea mixing pipe, wherein the urea mixing pipe is formed by an outer pipe and an inner pipe having a double pipe structure, the SCR case is formed by an inner case body and an outer case body having a double case structure, an exhaust gas outlet side end portion of the outer pipe is connected to an exhaust gas inlet of the inner case body, and an exhaust gas outlet side end portion of the inner pipe is provided in a protruding manner in an inner portion of the SCR case.

The engine device may be structured such that the exhaust gas outlet side end portion of the outer pipe is formed larger in diameter than an inlet opening of the inner case body, and the exhaust gas outlet side end portion of the outer pipe is fixed by welding to an outer peripheral surface of the inner case body.

The engine device may be structured such that an exhaust gas outlet side of an exhaust gas inlet pipe is firmly fixed to an inlet opening portion of the inner case body, an exhaust gas inlet side of the exhaust gas inlet pipe is firmly fixed to the exhaust gas outlet side end portion of the outer pipe, an exhaust gas inlet side of an extension pipe is connected to the exhaust gas outlet side end portion of the inner pipe, and an exhaust gas outlet side of the extension pipe is provided in a protruding manner in an inner portion of the inner case body.

According to the embodiment of the present invention, in the engine device having the urea mixing pipe which injects the urea water into the exhaust gas of the engine, and the SCR case which removes the nitrogen oxides in the exhaust gas of the engine, and structured such that the inlet side of the SCR case is connected to the outlet side of the urea mixing pipe, the urea mixing pipe is formed by the outer pipe and the inner pipe having the double pipe structure, the SCR case is formed by the inner case body and the outer case body having the double case structure, the exhaust gas outlet side end portion of the outer pipe is connected to the exhaust gas inlet of the inner case body, and the exhaust gas outlet side end portion of the inner pipe is provided in a protruding manner in the inner portion of the SCR case. As a result, it is possible to inhibit the inner pipe from coming into contact with outside air, and it is possible to reduce formation of a crystal lump of a urea component in an inner hole surface of the inner pipe. It is possible to easily prevent an exhaust gas resistance of the inner pipe from being increased by growth of the urea crystal lump.

According to the embodiment of the present invention, the exhaust gas outlet side end portion of the outer pipe is formed larger in diameter than the inlet opening of the inner case body, and the exhaust gas outlet side end portion of the outer pipe is fixed by welding to the outer peripheral surface of the inner case body. As a result, the exhaust gas outlet side end portion of the outer pipe can be bonded to an outer peripheral surface which is spaced from an inlet opening edge of the inner case body in the outer peripheral surface of the inner case body. More specifically, the outer pipe (the exhaust gas outlet side end portion) can be firmly fixed easily by welding to the outer peripheral surface of the inner case body, while preventing deformation of the inner case body, and the exhaust gas outlet side end portion of the outer pipe can be connected with high rigidity to the outer peripheral surface of the inner case body so as to be spaced from the inlet opening edge of the inner case body. Therefore, it is possible to improve a connection strength between the outer peripheral surface of the inner case body and the exhaust gas outlet side end portion of the outer pipe.

According to the embodiment of the present invention, the exhaust gas outlet side of the exhaust gas inlet pipe is firmly fixed to the inlet opening portion of the inner case body, the exhaust gas inlet side of the exhaust gas inlet pipe is firmly fixed to the exhaust gas outlet side end portion of the outer pipe, the exhaust gas inlet side of the extension pipe is connected to the exhaust gas outlet side end portion of the inner pipe, and the exhaust gas outlet side of the extension pipe is provided in a protruding manner in the inner portion of the inner case body. As a result, the urea mixing pipe can be connected to the SCR case without contact of the inner pipe (the exhaust gas) with the connection portion (the exhaust gas inlet pipe) between the SCR case and the outer pipe, and it is possible to prevent the urea crystal lump from being formed in the vicinity of the SCR case inlet (the joint portion with the urea mixing pipe).

DESCRIPTION OF THE EMBODIMENTS

Figure 1:
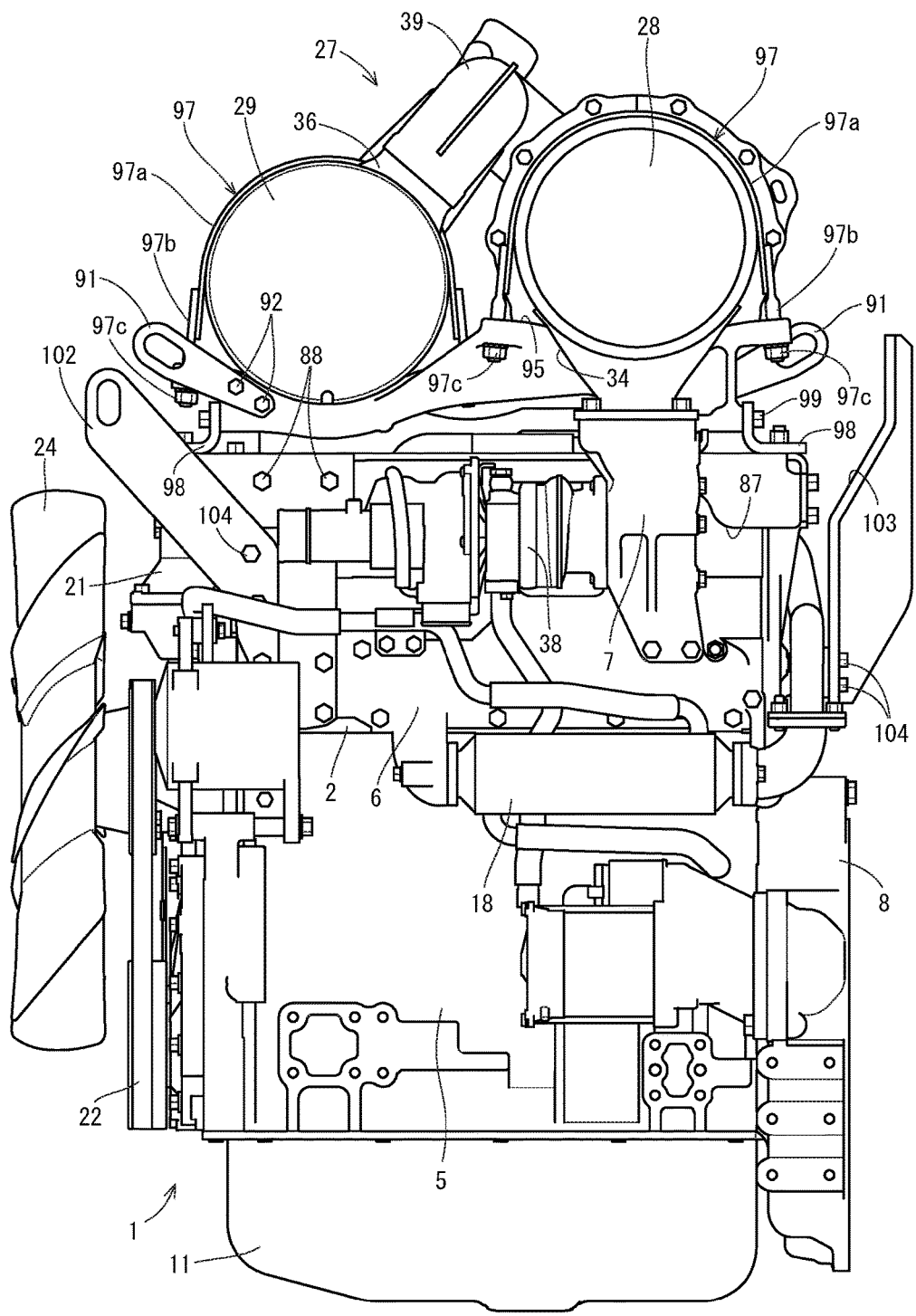
FIG. 1 is a left side elevational view of a diesel engine and shows a first embodiment.
Figure 2:
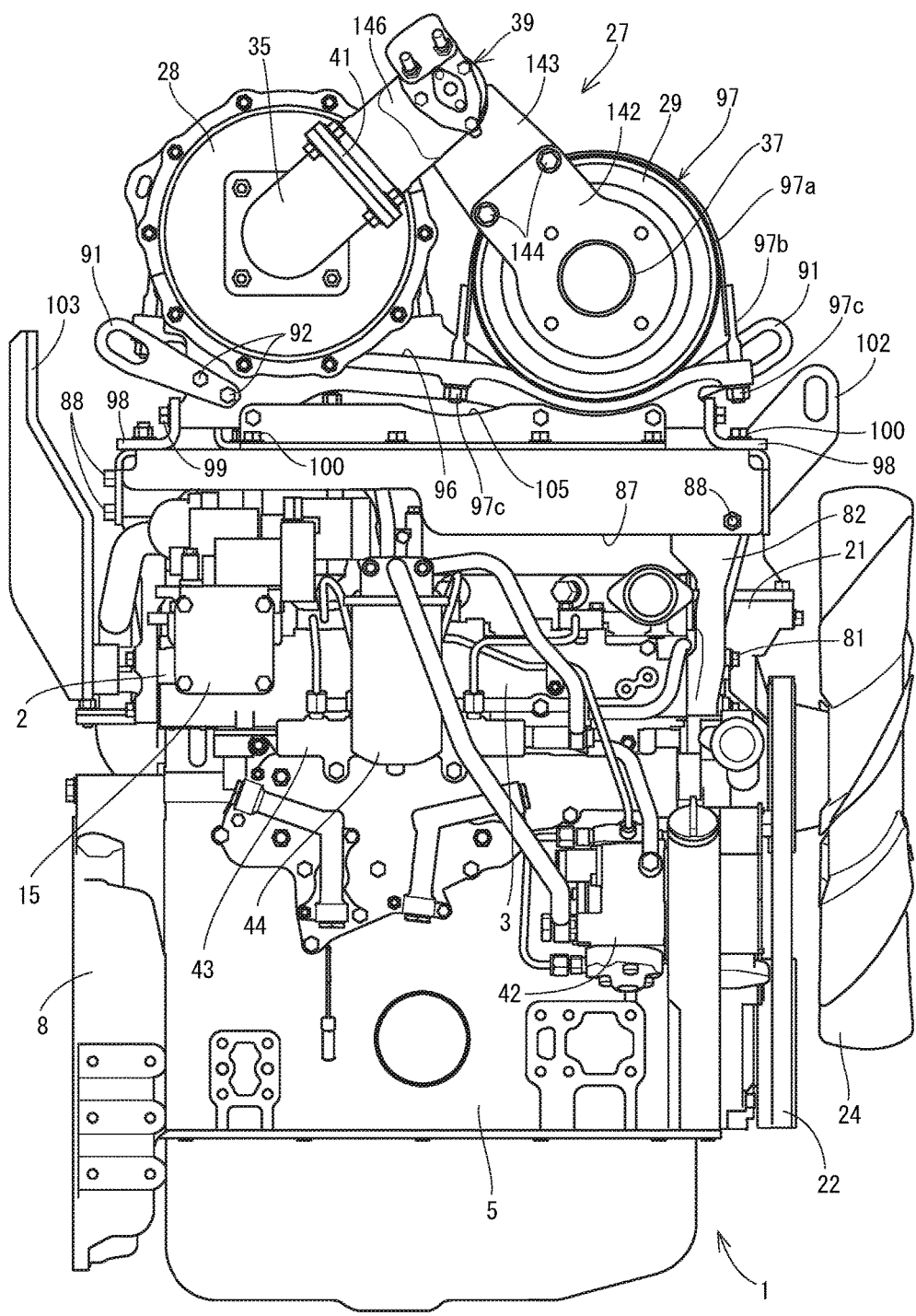
FIG. 2 is a right side elevational view of the same.
Figure 3:
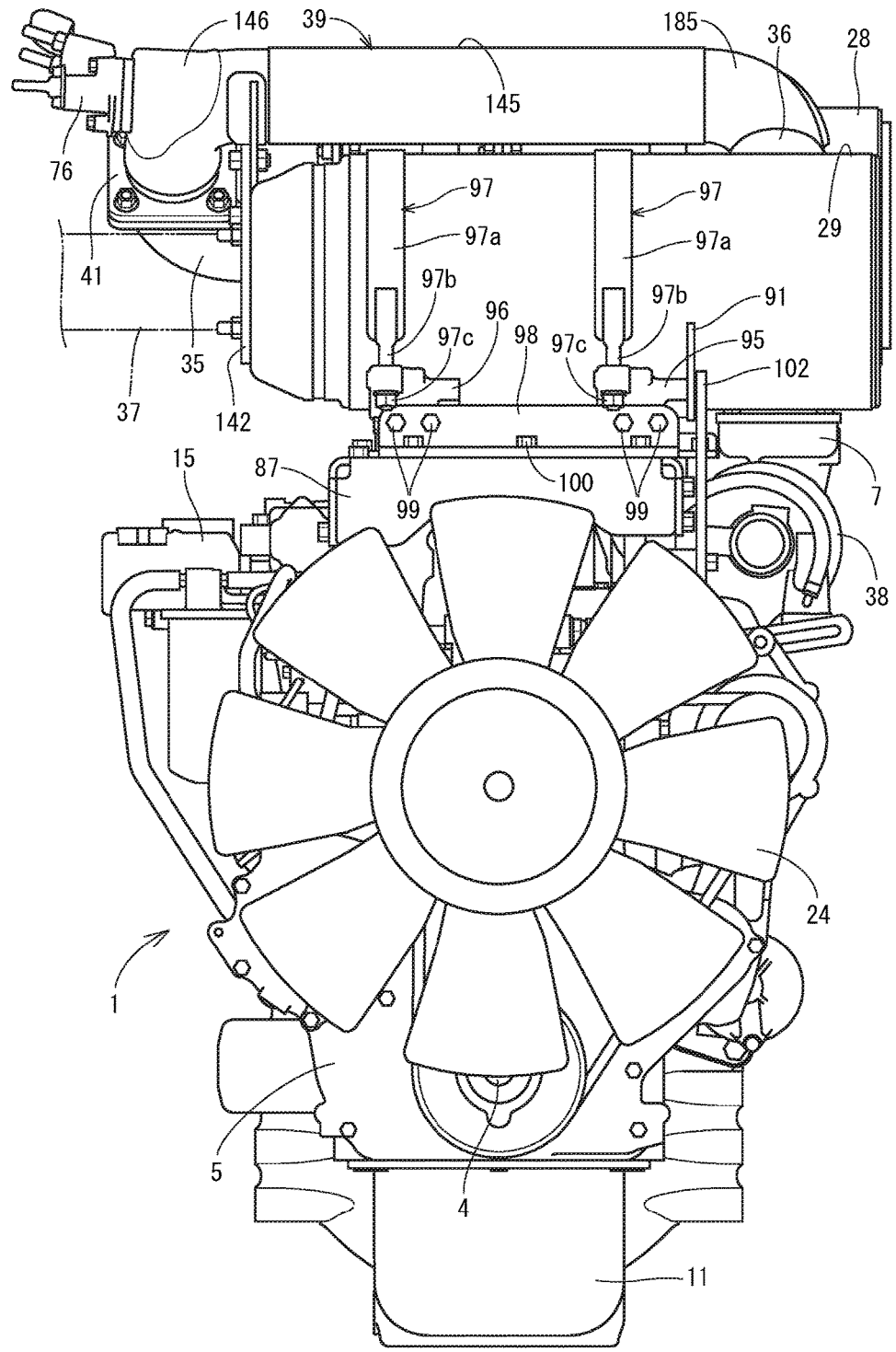
FIG. 3 is a front elevational view of the same.

A description will be given below of a first embodiment obtained by embodying the present invention with reference to the accompanying drawings (FIGS. 1 to 20). FIG. 1 is a left side elevational view of a diesel engine 1 in which an exhaust gas manifold 6 is installed, FIG. 2 is a right side elevational view of the diesel engine 1 in which an intake air manifold 3 is installed, and FIG. 3 is a front elevational view of the diesel engine 1 in which a cooling fan 24 is installed.

A side in which the exhaust gas manifold 6 is installed is called as a left side surface of the diesel engine 1, a side in which the intake air manifold 3 is installed is called as a right side surface of the diesel engine 1, and a side in which the cooling fan 24 is installed is called as a front surface of the diesel engine 1.

A description will be given of a whole structure of the diesel engine 1 with reference to FIGS. 1 to 5. As shown in FIGS. 1 to 5, an intake air manifold 3 is arranged in one side surface of a cylinder head 2 of a diesel engine 1. The cylinder head 2 is mounted on a cylinder block 5 which has an engine output shaft 4 (a crank shaft) and a piston (not shown) built-in. An exhaust gas manifold 6 is arranged in the other side surface of the cylinder head 2. A front end and a rear end of the engine output shaft 4 are protruded out of a front surface and a back surface of the cylinder block 5.

As shown in FIGS. 1 to 5, a flywheel housing 8 is firmly fixed to the back surface of the cylinder block 5. A flywheel 9 is provided within the flywheel housing 8. The flywheel 9 is axially supported to the rear end side of the engine output shaft 4. Power of the diesel engine 1 is adapted to be taken out via the flywheel 9. Further, a sump 11 is arranged in a lower surface of the cylinder block 5.

As shown in FIGS. 2 to 5, an exhaust gas recirculation device (EGR) 15 taking into exhaust gas for recirculation is arranged in the intake air manifold 3. An air cleaner 16 (refer to FIG. 21) is connected to the intake air manifold 3. External air which is dust removed and purified by the air cleaner 16 is adapted to be fed to the intake air manifold 3, and be supplied to each of cylinders of the diesel engine 1.

According to the above structure, the exhaust gas discharged out of the diesel engine 1 to the exhaust gas manifold 6 is partly reflowed to each of the cylinders of the diesel engine 1 from the intake air manifold 3 via the exhaust gas recirculation device 15. As a result, a combustion temperature of the diesel engine 1 is lowered, a discharge amount of nitrogen oxides (NOx) from the diesel engine 1 is lowered, and a fuel consumption of the diesel engine 1 is improved.

Figure 21:
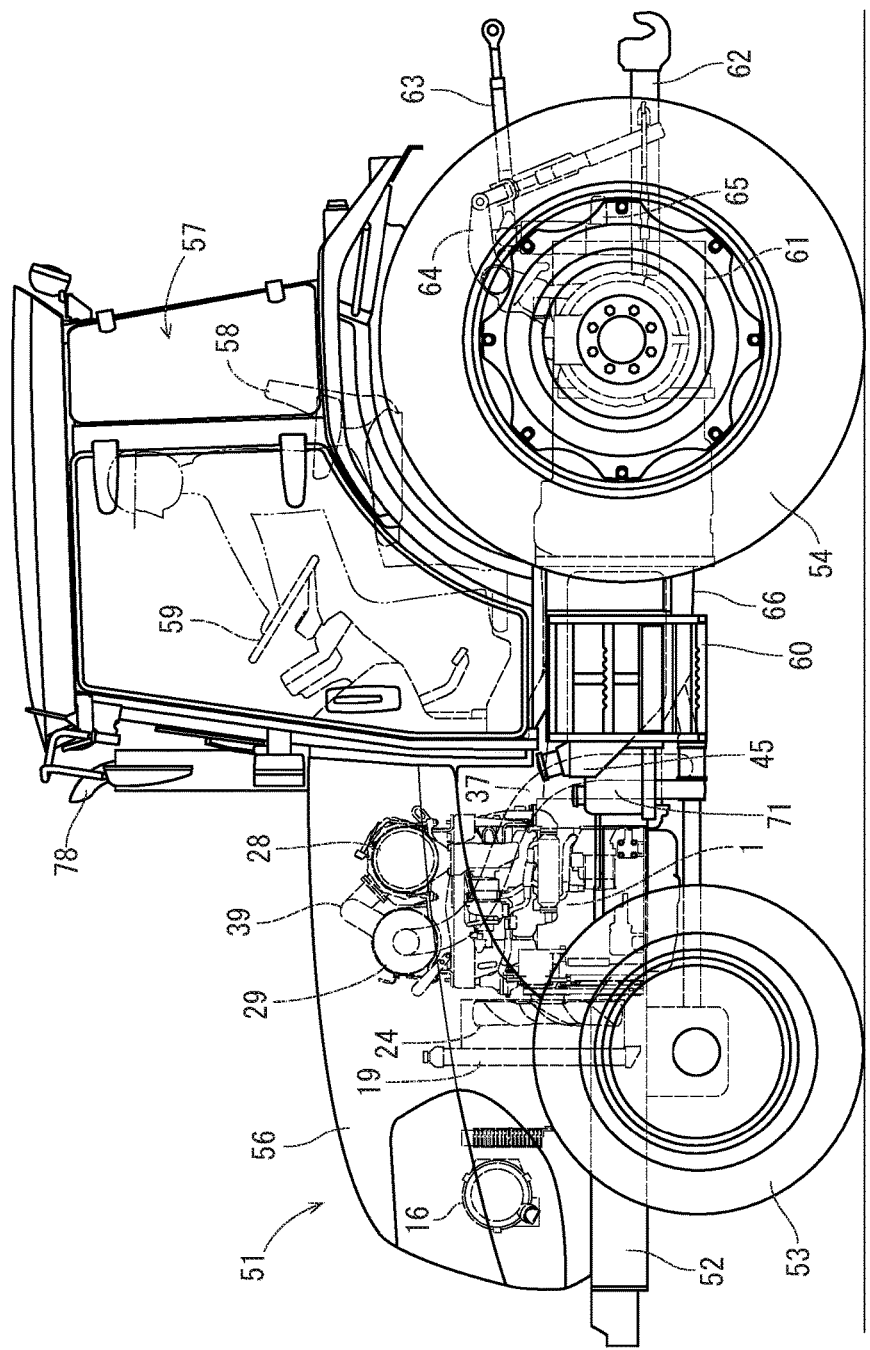
FIG. 21 is a left side elevational view of a tractor which mounts a diesel engine thereto.

A cooling water pump 21 is provided for circulating cooling water within the cylinder block 5 and in a radiator 19 (refer to FIG. 21). The cooling water pump 21 is arranged in a side where a cooling fan 24 is installed in the diesel engine 1. The cooling water pump 21 and the cooling fan 24 are coupled to the engine output shaft 4 via a V-belt 22, and the cooling water pump 21 and the cooling fan 24 are driven. The cooling water is fed into the cylinder block 5 from the cooling water pump 21 via an EGR cooler 18 of the exhaust gas recirculation device 15, and the diesel engine 1 is structured such as to be cooled by the wind of the cooling fan 24.

Figure 4:
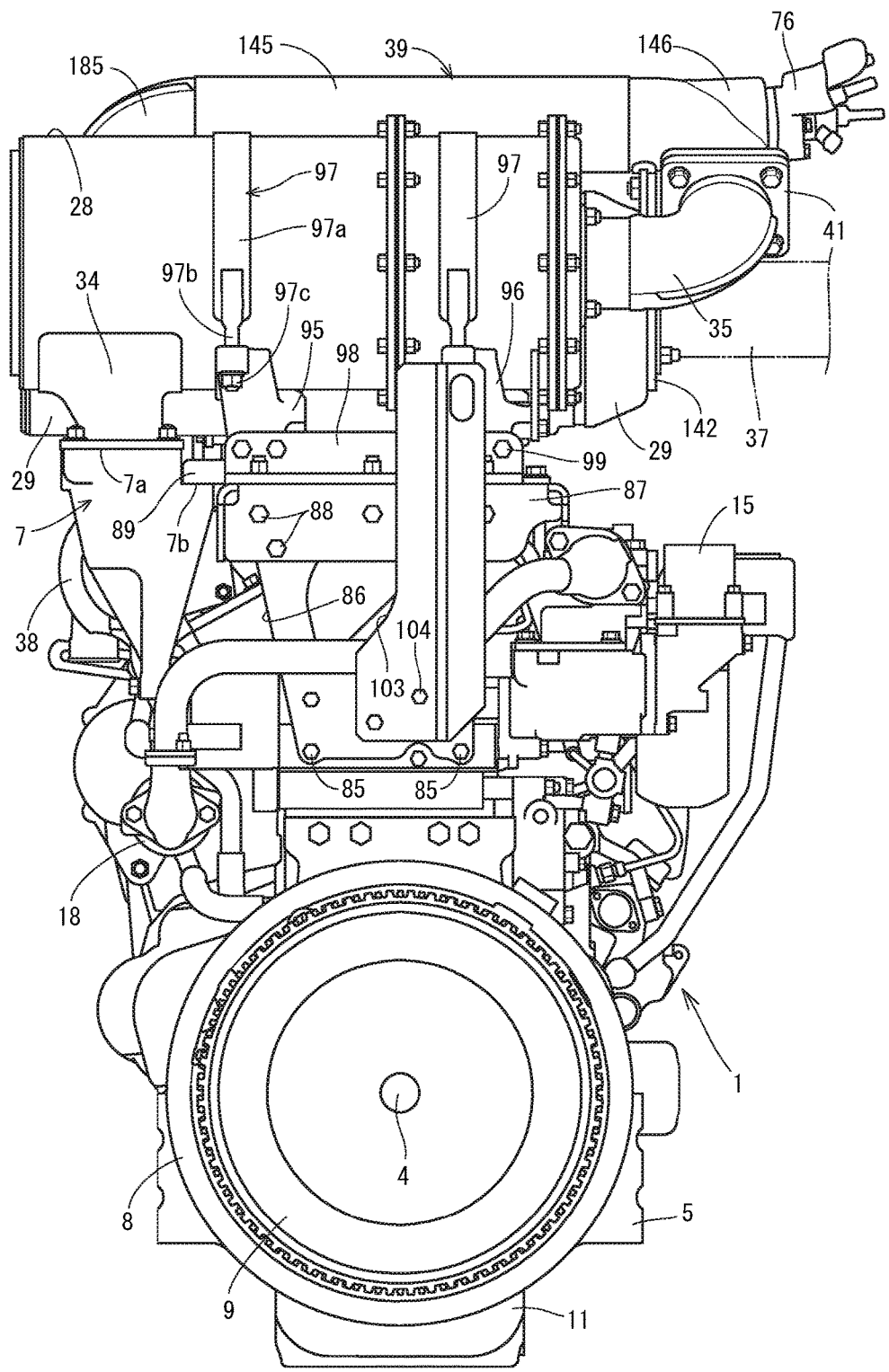
FIG. 4 is a back elevational view of the same.
Figure 5:
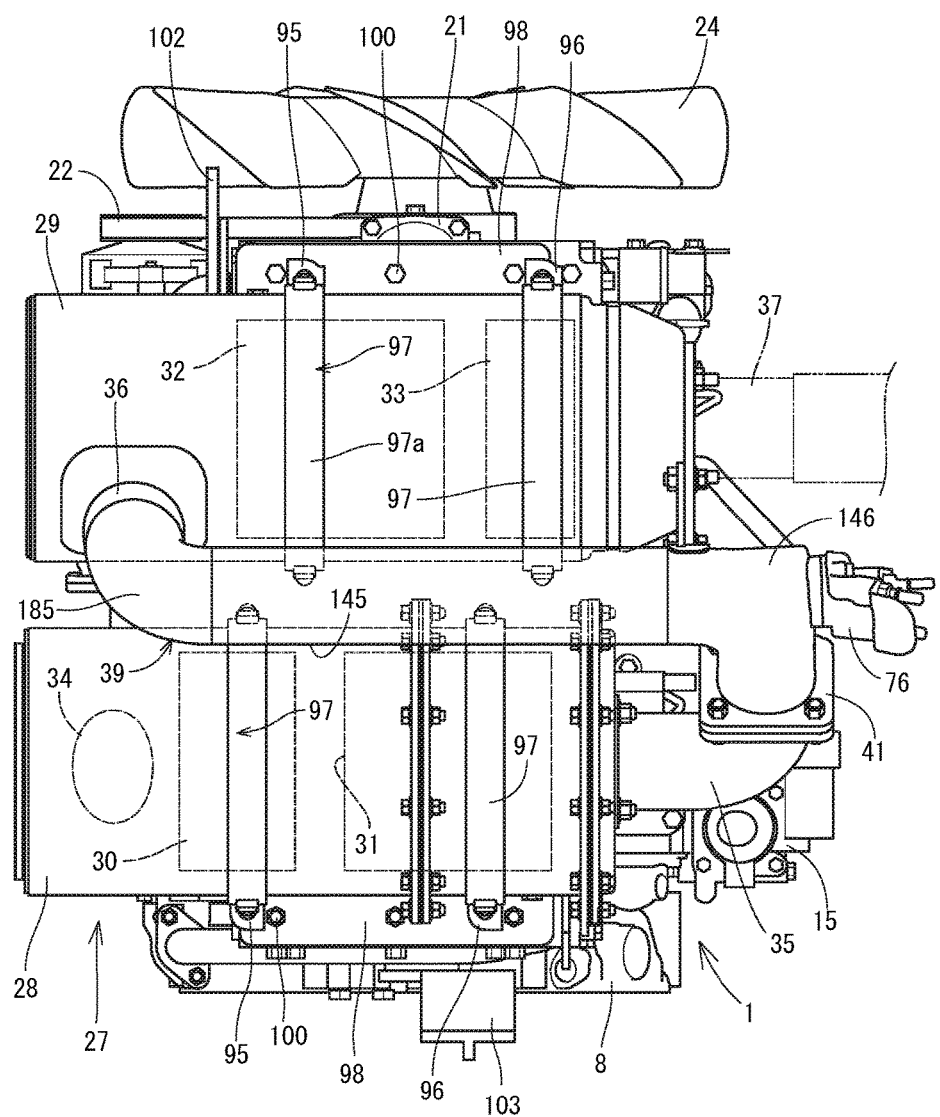
FIG. 5 is a plan view of the same.
Figure 6:
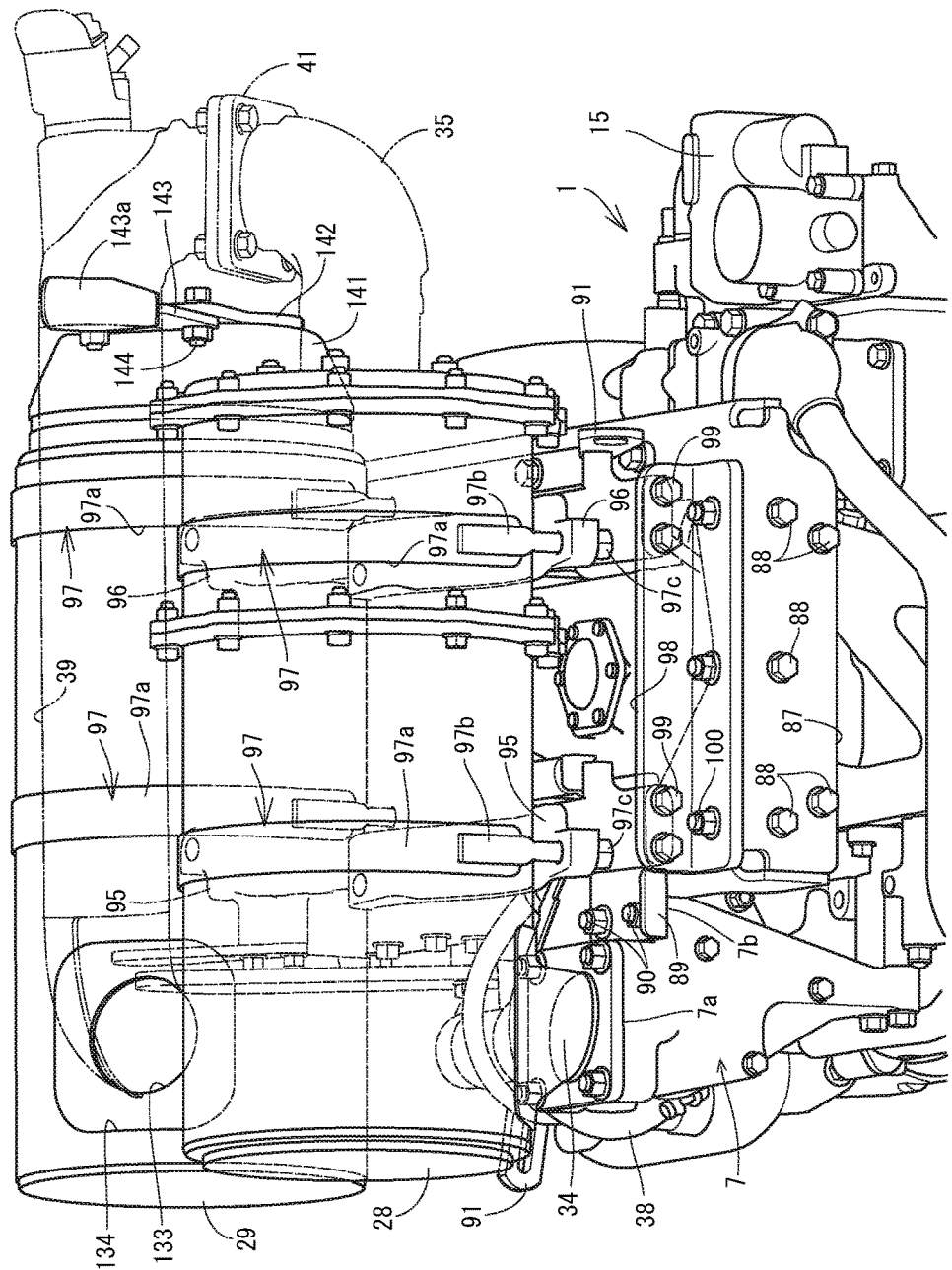
FIG. 6 is an explanatory view in a back elevational view of an upper portion of the same in a state in which an exhaust gas purification device is attached.
Figure 7:
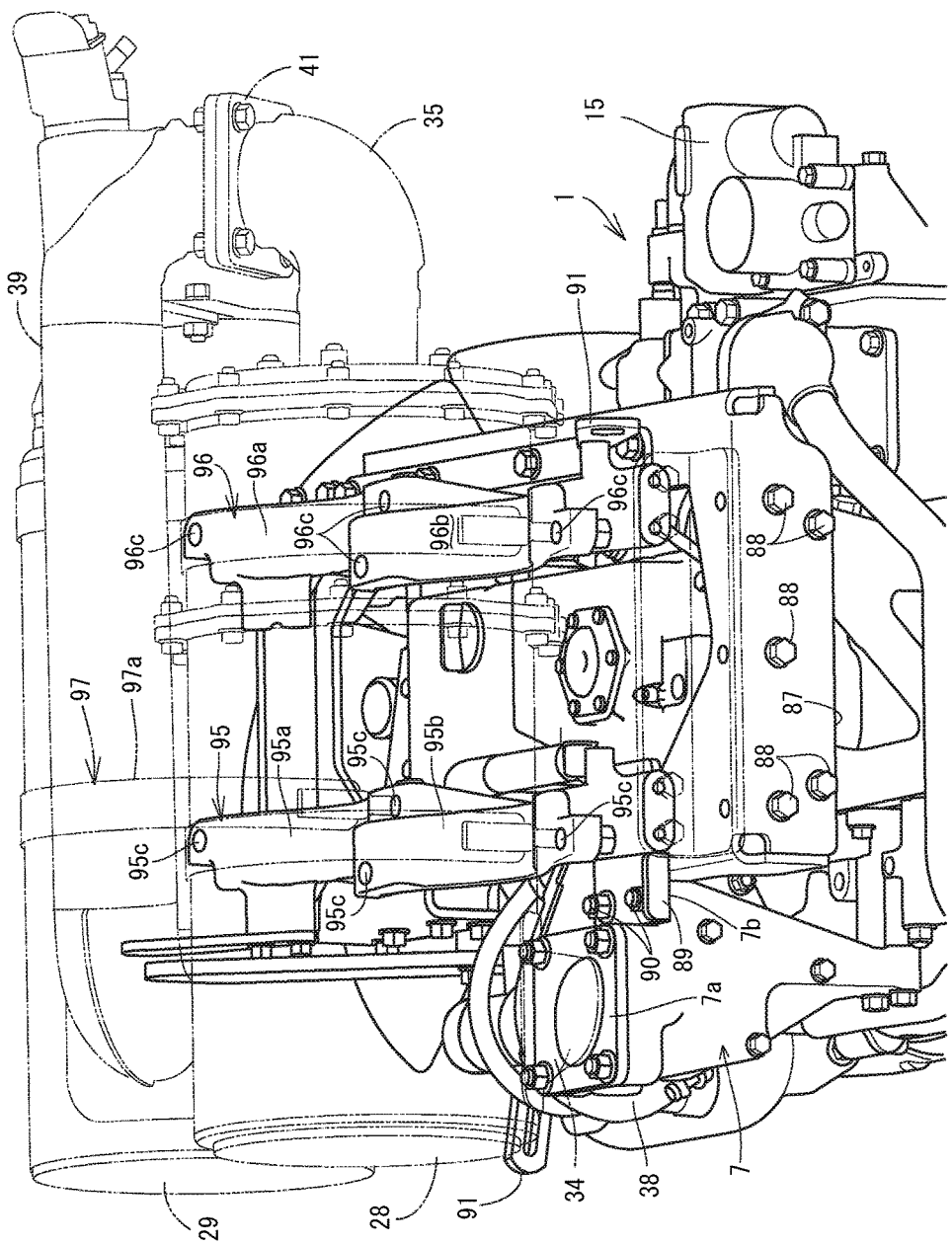
FIG. 7 is an explanatory view in a back elevational view of the upper portion of the same in a state in which the exhaust gas purification device is detached.
Figure 8:
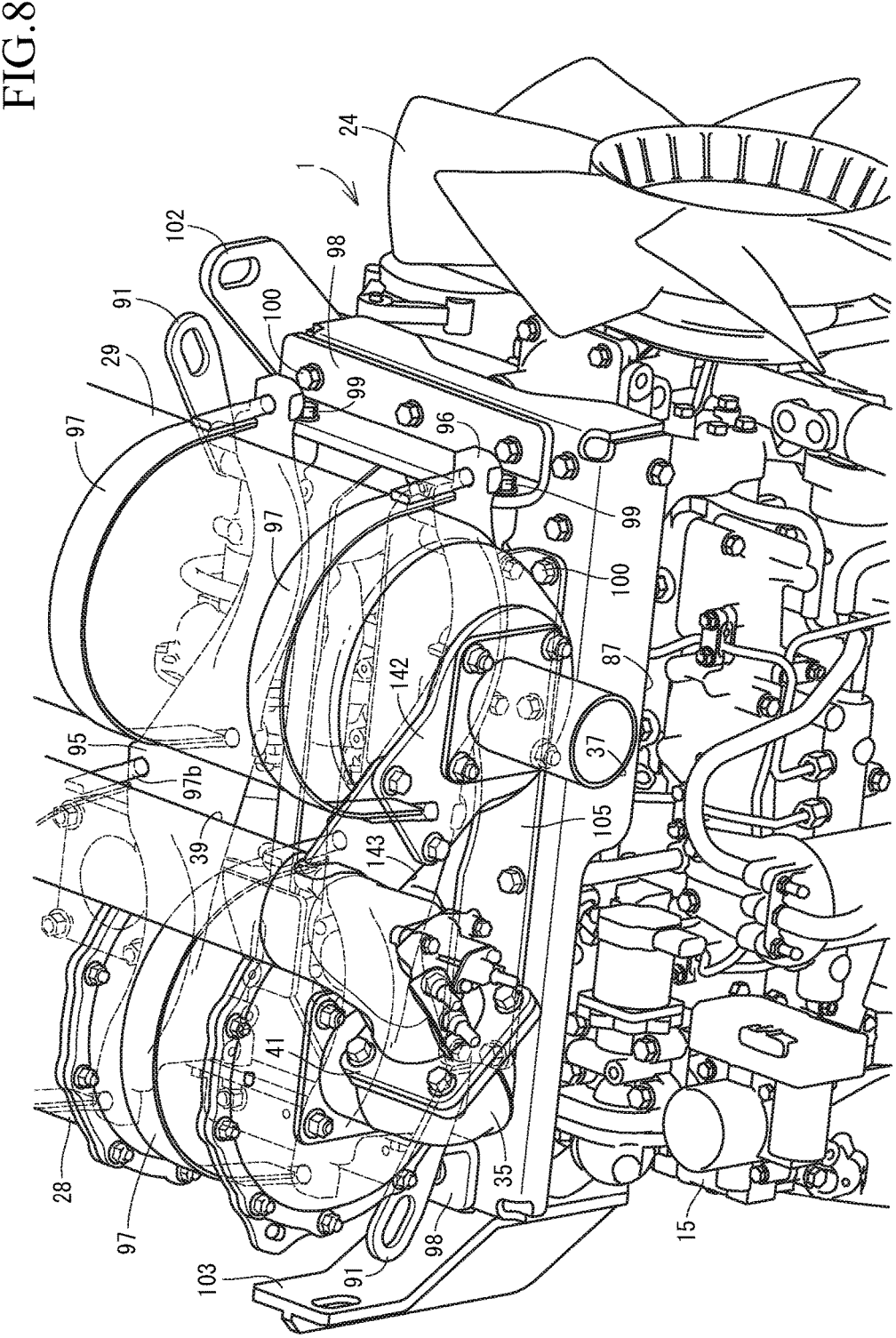
FIG. 8 is an explanatory view in a right side elevational view of the upper portion of the same in a state in which the exhaust gas purification device is attached.
Figure 9:
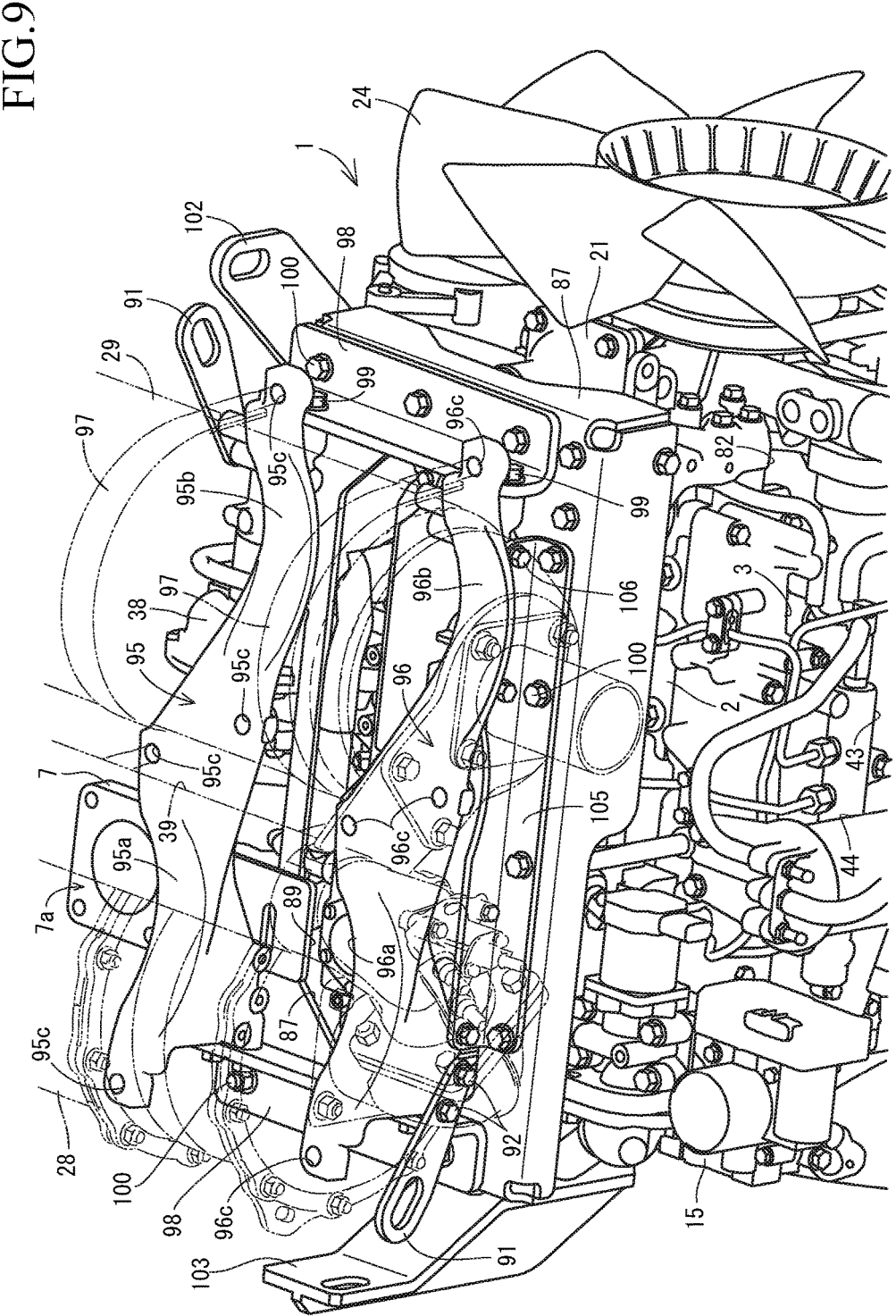
FIG. 9 is an explanatory view in a right side elevational view of the upper portion of the same in a state in which the exhaust gas purification device is detached.
Figure 10:
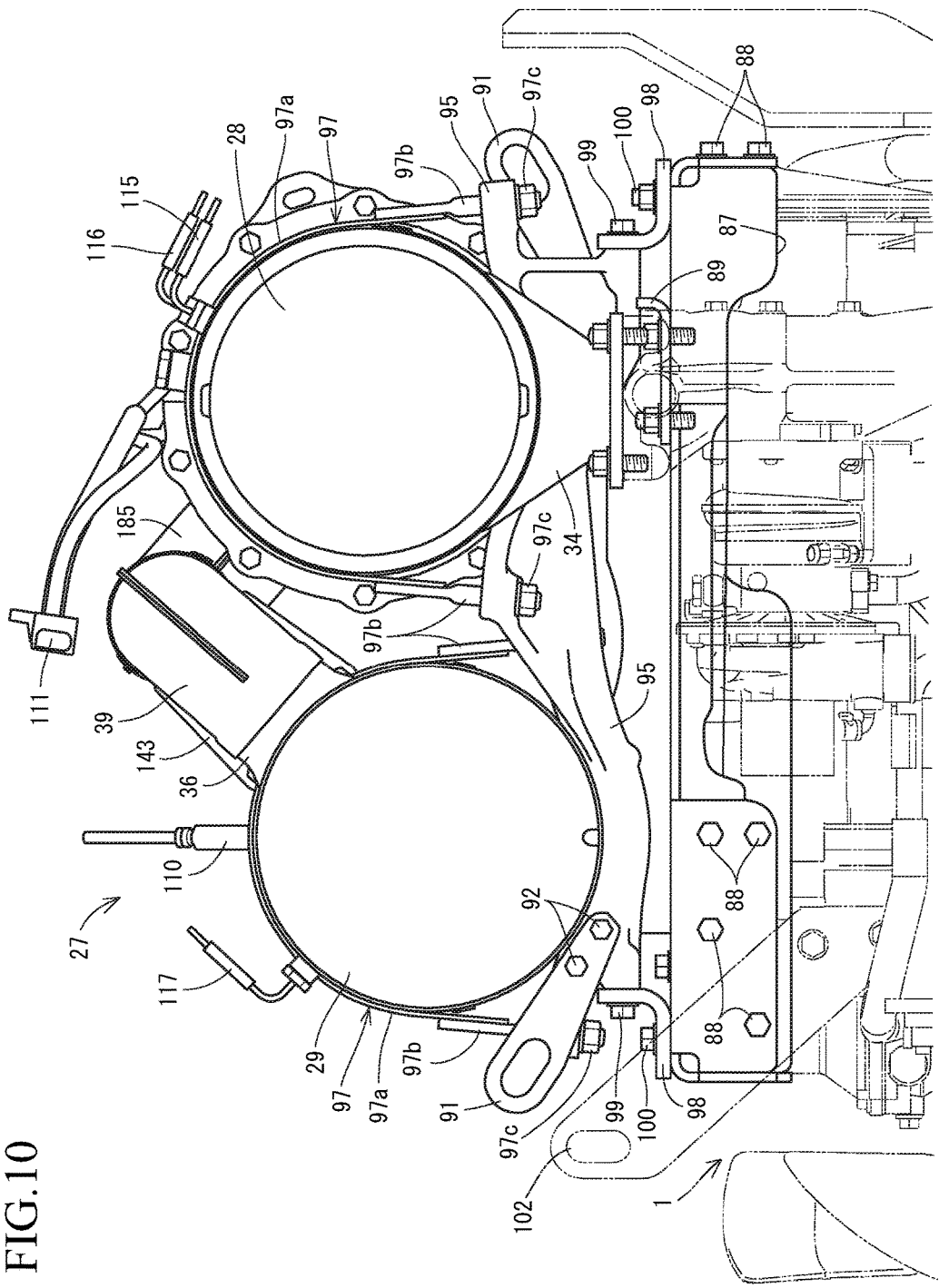
FIG. 10 is a left side elevational view of the exhaust gas purification device.

As shown in FIGS. 1 to 5, as an exhaust gas purification device 27 for purifying the exhaust gas discharged out of the cylinders of the diesel engine 1, there are provided a first case 28 serving as a diesel particulate filter (DPF) which removes particulate matters in the exhaust gas of the diesel engine 1, and a second case 29 serving as a urea selective catalyst reducing (SCR) system which removes nitrogen oxides in the exhaust gas of the diesel engine 1. As shown in FIG. 5, an oxidation catalyst 30 and a soot filter 31 are inward provided in the first case 28 serving as the DPF case. An SCR catalyst 32 for reducing the urea selective catalyst and an oxidation catalyst 33 are inward provided in the second case 29 serving as the SCR case.

The exhaust gas discharged out of the cylinders of the diesel engine 1 to the exhaust gas manifold 6 is discharged outward via the exhaust gas purification device 27. The exhaust gas purification device 27 is adapted to reduce carbon monoxide (CO), carbon hydride (HC), particulate matters (PM), and nitrogen oxides (NOx) in the exhaust gas of the diesel engine 1.

As shown in FIGS. 3 to 5, the first case 28 and the second case 29 are formed into a long cylindrical shape which extends long in an orthogonal direction intersecting the output shaft (the crank shaft) 4 of the diesel engine 1 in a plan view. A DPF inlet pipe 34 taking into the exhaust gas, and a DPF outlet pipe 35 discharging the exhaust gas are provided in both sides (one end side and the other end side in an exhaust gas moving direction) of a tubular shape of the first case 28. In the same manner, an SCR inlet pipe 36 taking into the exhaust gas, and an SCR outlet pipe 37 discharging the exhaust gas are provided in both sides (one end side and the other end side in the exhaust gas moving direction) of the second case 29.

Further, a supercharger 38 forcibly feeding air into the diesel engine 1, and an exhaust gas outlet pipe 7 fastened by bolts to the exhaust gas manifold 6 are arranged in an exhaust gas outlet of the exhaust gas manifold 6. The exhaust gas of the diesel engine 1 is adapted to be introduced into the first case 28 by communicating the DPF inlet pipe 34 with the exhaust gas manifold 6 via the supercharger 38 and the exhaust gas outlet pipe 7. Meanwhile, the exhaust gas of the first case 28 is adapted to be introduced into the second case 29 by connecting the SCR inlet pipe 36 to the DPF outlet pipe 35 via a urea mixing pipe 39 mentioned later. In addition, the DPF outlet pipe 35 and the urea mixing pipe 39 are detachably connected by a DPF outlet side flange body 41 for fastening by bolts. The SCR inlet pipe 36 and the urea mixing pipe 39 are integrally connected by welding process.

As shown in FIG. 2, each of injectors (not shown) for multiple cylinders of the diesel engine 1 is provided with a fuel pump 42 to which a fuel tank 45 shown in FIG. 21 (FIG. 22) is connected and a common rail 43. The common rail 43 and a fuel filter 44 are arranged in a side where the intake air manifold 3 is installed in the cylinder head 2, and the fuel pump 42 is arranged in a cylinder block 5 below the intake air manifold 3. Each of the injectors has an electromagnetic opening and closing control type fuel injection valve (not shown).

The fuel within the fuel tank 45 is sucked into the fuel pump 42 via the fuel filter 44. Meanwhile, the common rail 43 is connected to the discharge side of the fuel pump 42, and the cylindrical common rail 43 is connected to each of the injectors of the diesel engine 1. A surplus of the fuel which is pressure fed to the common rail 43 from the fuel pump 42 is returned to the fuel tank 45, the high-pressure fuel is temporarily stored in the common rail 43, and the high-pressure fuel in the common rail 43 is supplied to an inner portion of each of the cylinders of the diesel engine 1.

According to the structure mentioned above, the fuel in the fuel tank 45 is pressure fed to the common rail 43 by the fuel pump 42, the high-pressure fuel is stored in the common rail 43, and the fuel injection valve in each of the injectors is controlled to be opened and closed. As a result, the high-pressure fuel in the common rail 43 is injected to each of the cylinders in the diesel engine 1. In other words, an injection pressure, an injection timing, and an injection period (an injection amount) of the fuel can be controlled with a high precision by electronically controlling the fuel injection valve in each of the injectors. Therefore, it is possible to reduce the nitrogen oxides (NOx) discharged out of the diesel engine 1.

Further, a description will be given of an attaching structure between the first case 28 and the second case 29 with reference to FIGS. 1 to 14. As shown in FIGS. 2, 4, 13, 17, and 18, there are provided a front portion support leg body 82 which is fastened by bolts 81 its lower end side to a right corner portion in a front surface of the cylinder head 2, a side portion leg body 84 which is fastened by bolts 83 its lower end side to a front corner portion in a left side surface of the cylinder head 2, and a rear portion support leg body 86 which is fastened by bolts 85 its lower end side to a rear surface of the cylinder head 2, and each of the support leg bodies 82, 84, and 86 is provided in a rising manner in the cylinder head 2. A rectangular support base 87 formed by sheet metal processing is provided, and side surfaces and an upper surface side of the support base 87 are fastened by bolts 88 to upper end sides of the support leg bodies 82, 84, and 86. Further, a tabular positioning body 89 is fixed by welding to the upper surface of the support base 87 which is provided in relation to the exhaust gas outlet pipe 7, a flat positioning step portion 7b is formed in the exhaust gas outlet pipe 7 in parallel to the flat exhaust gas outlet surface 7a of the exhaust gas outlet pipe 7 which is opened upwardly, a part of a tabular lower surface of the positioning body 89 is brought into surface contact with the positioning step portion 7b, and the positioning body 89 is fastened to the exhaust gas outlet pipe 7 by positioning bolts 90. The upper surface of the support base 87 is adapted to be approximately horizontal to the diesel engine 1 on the basis of a surface contact between the exhaust gas outlet pipe 7 (the flat upper surface of the positioning step portion 7b) and the flat lower surface of the positioning body 89.

As shown in FIGS. 1 to 14, 17, and 18, a pair of left case fixing body 95 and right case fixing body 96, and four fastening bands 97 having fastening bolts in both end sides are provided as a pinching body arranging the first case 28 and the second case 29 in parallel. The first case 28 is firmly fixed detachably to rear mounting portions 95a and 96a of the left case fixing body 95 and the right case fixing body 96 by a pair of right and left fastening bands 97, and the second case 29 is firmly fixed detachably to front mounting portions 95b and 96b of the left case fixing body 95 and the right case fixing body 96 by a pair of right and left fastening bands 97. Therefore, the cylindrical first case 28 and second case 29 which are long in a lateral direction are arranged in parallel in an upper surface side of the diesel engine 1, the first case 28 is positioned in the upper surface rear side (the rear mounting portions 95a and 96a) of the diesel engine 1, and the second case 29 is positioned in the upper surface front side (the front mounting portions 95b and 96b) of the diesel engine 1. The front mounting portions 95b and 96b are formed in the upper surface side of the diesel engine 1 to be lower than the rear mounting portions 95a and 96a, support heights of the first case 28 and the second case 29 are differentiated, and the urea mixing pipe 39 is supported at a low position of the upper surface of the diesel engine 1, so that the upper surface side height of the diesel engine 1 is adapted to be formable low.

As shown in FIGS. 6 to 14, front and rear support frame bodies 98 are fastened by bolts 99 to front and rear end portions of the left case fixing body 95 and the right case fixing body 96 so as to be adjustable their attachment positions (support attitudes), a side portion support frame body 105 is fastened by bolts 106 to a side surface of the right case fixing body 96 so as to be adjustable its attachment position (support attitude), the left and right case fixing bodies 95 and 96, the front and rear support frame bodies 98, and the side portion support frame body 105 are connected like a quadrangular frame shape, the front and rear support frame bodies 98 and the side portion support frame body 105 are fastened by bolts 100 to the upper surface of the support base 87, and the first case 28 and the second case 29 are firmly fixed to the upper surface of the support base 87 via the left and right case fixing bodies 95 and 96 and the fastening bands 97, thereby constructing the exhaust gas purification device 27 serving as the exhaust gas purification unit.

As shown in FIGS. 6 to 10, four fastening bands 97 are provided as a plurality of pinching bodies. The fastening band 97 has a belt-like fastening band main body 97a, and a fastening bolt 97b which is firmly fixed to both end sides of the fastening band main body 97a. In a state in which the fastening band main body 97a is wound around the first case 28 or the second case 29, a leading end side of the fastening bolt 97b is fitted and inserted to bolt holes 95c and 96c of the left case fixing body 95 and the right case fixing body 96, a fastening nut 97c is threadably attached to the leading end side of the fastening bolt 97b, and the first case 28 is firmly fixed to the rear mounting portions 95a and 96a of the left case fixing body 95 and the right case fixing body 96 via two left and right fastening bands 97. Further, the second case 29 is firmly fixed to the front mounting portions 95b and 96b of the left case fixing body 95 and the right case fixing body 96 via two left and right fastening bands 97, and the first case 28 and the second case 29 which are long in the lateral direction and are formed into the cylindrical shapes are arranged in a sideways falling attitude in the upper surface side of the diesel engine 1.

Further, left and right unit suspension members 91 are fastened by bolts 92 to a front end side of the left case fixing body 95 and a rear end side of the right case fixing body 96, the left and right unit suspension members 91 are arranged at diagonal positions of the quadrangular frame of the left and right case fixing bodies 95 and 96 and the front and rear support frame bodies 98, and the exhaust gas purification device 27 is adapted to be movable in a suspended state via the left and right unit suspension members 91 by using a material handling machine such as a hoist or a chain block. Meanwhile, the diesel engine 1 is structured such as to be movable in a suspended state via the front and rear engine suspension members 102 and 103 by fastening the front and rear engine suspension members 102 and 103 by bolts 104 to the left side front portion and the back surface portion of the cylinder head 2 of the diesel engine 1, and using the material handling machine such as the hoist or the chain block.

Figure 15:
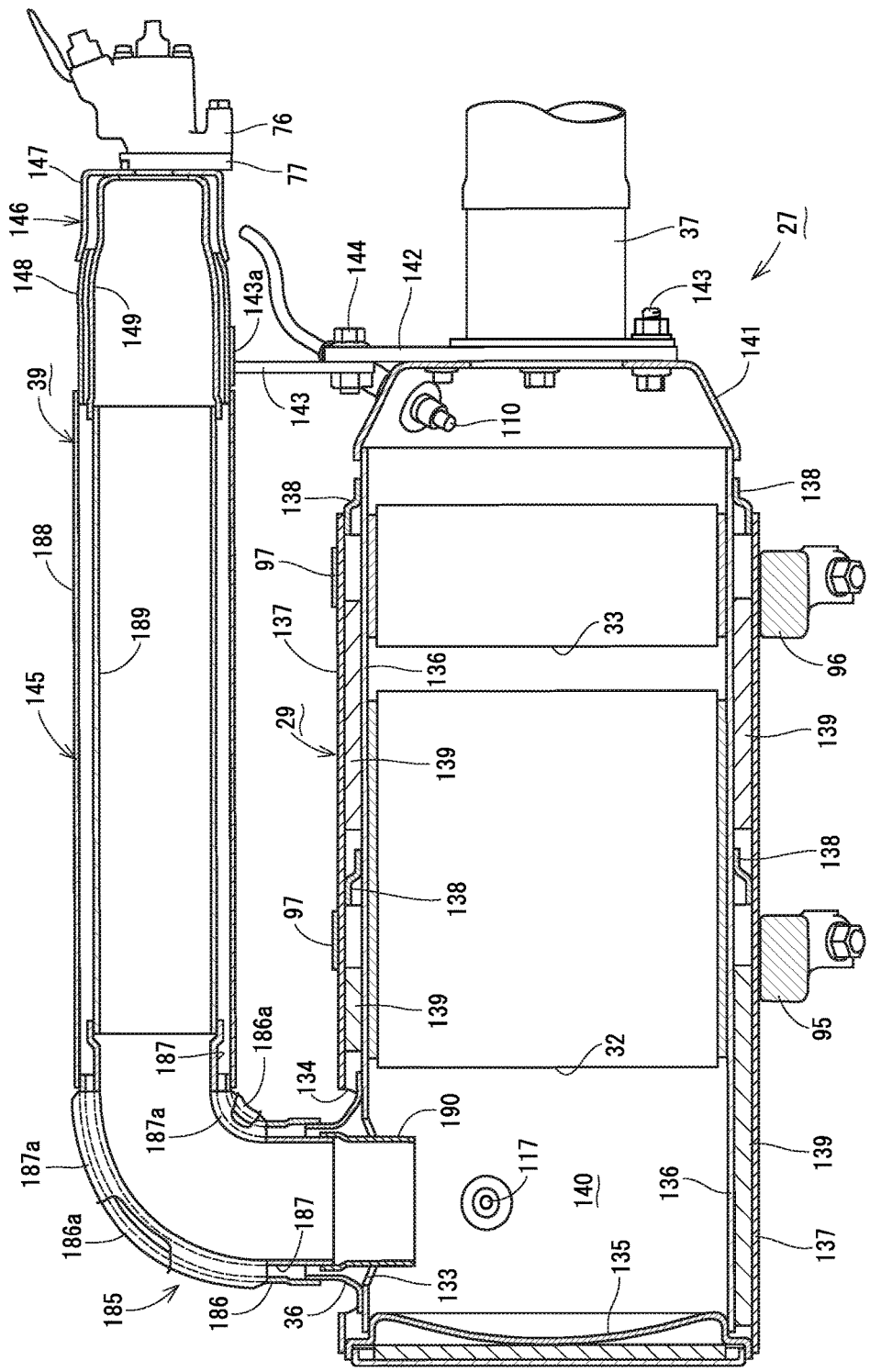
FIG. 15 is an explanatory view of a cross section of a second case and a urea mixing pipe.

Next, a description will be given of a structure of the second case 29 and the urea mixing pipe 39 with reference to FIGS. 3, 15, and 16. As shown in FIGS. 3 and 15, the urea mixing pipe 39 is formed by a straight tubular portion 145 which forms ammonia according to a hydrolysis of the urea, a urea water injection portion 146 which is provided in an exhaust gas upstream side end portion of the straight tubular portion 145, and an elbow tubular portion 185. An exhaust gas inlet side of the urea water injection portion 46 is fastened by bolts to an exhaust gas outlet side of a DPF outlet pipe 35 by the DPF outlet side flange body 41, an exhaust gas inlet side of the straight tubular portion 145 is fixed by welding to an exhaust gas outlet side of the urea water injection portion 146, and an exhaust gas inlet side of the elbow tubular portion 185 is fixed by welding to an exhaust gas outlet side of the straight tubular portion 145, thereby moving the exhaust gas from the first case 28 to the urea mixing pipe 39.

Figure 16:
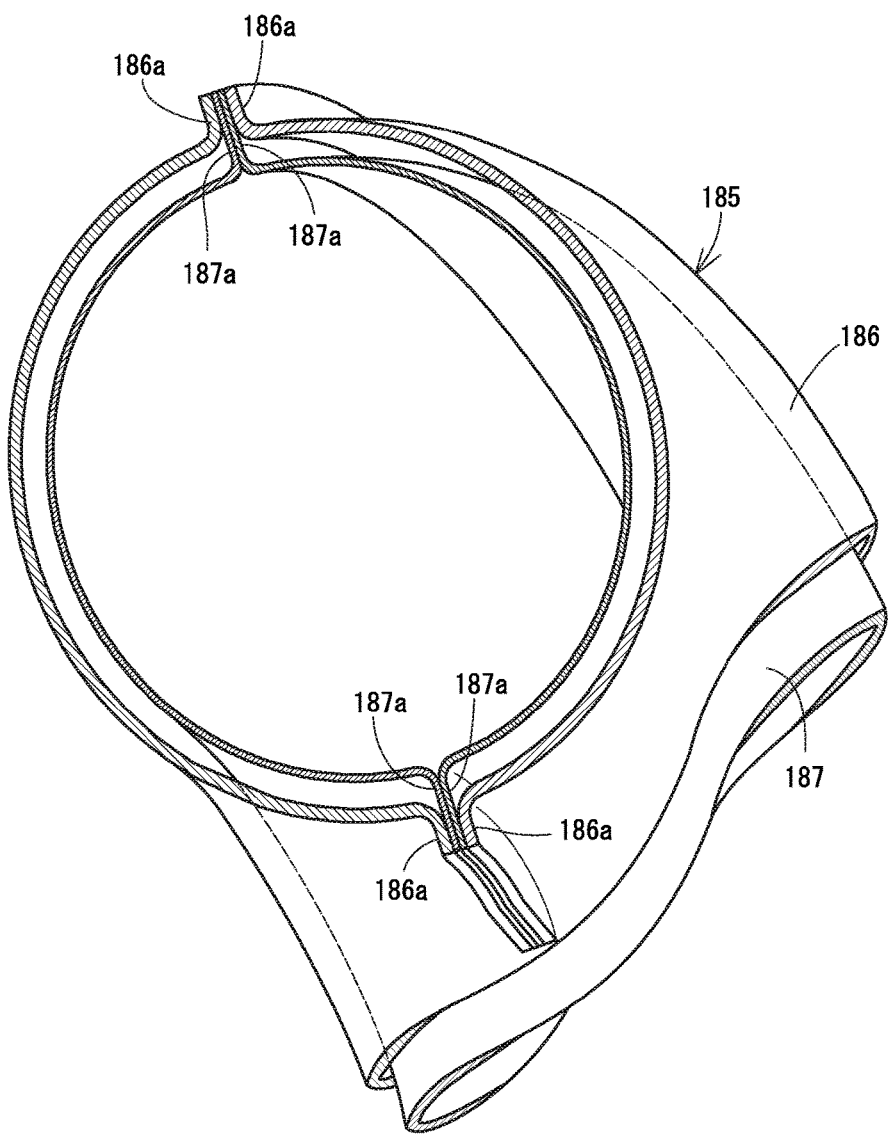
FIG. 16 is an explanatory view of a cross section of the urea mixing pipe.
Figure 17:
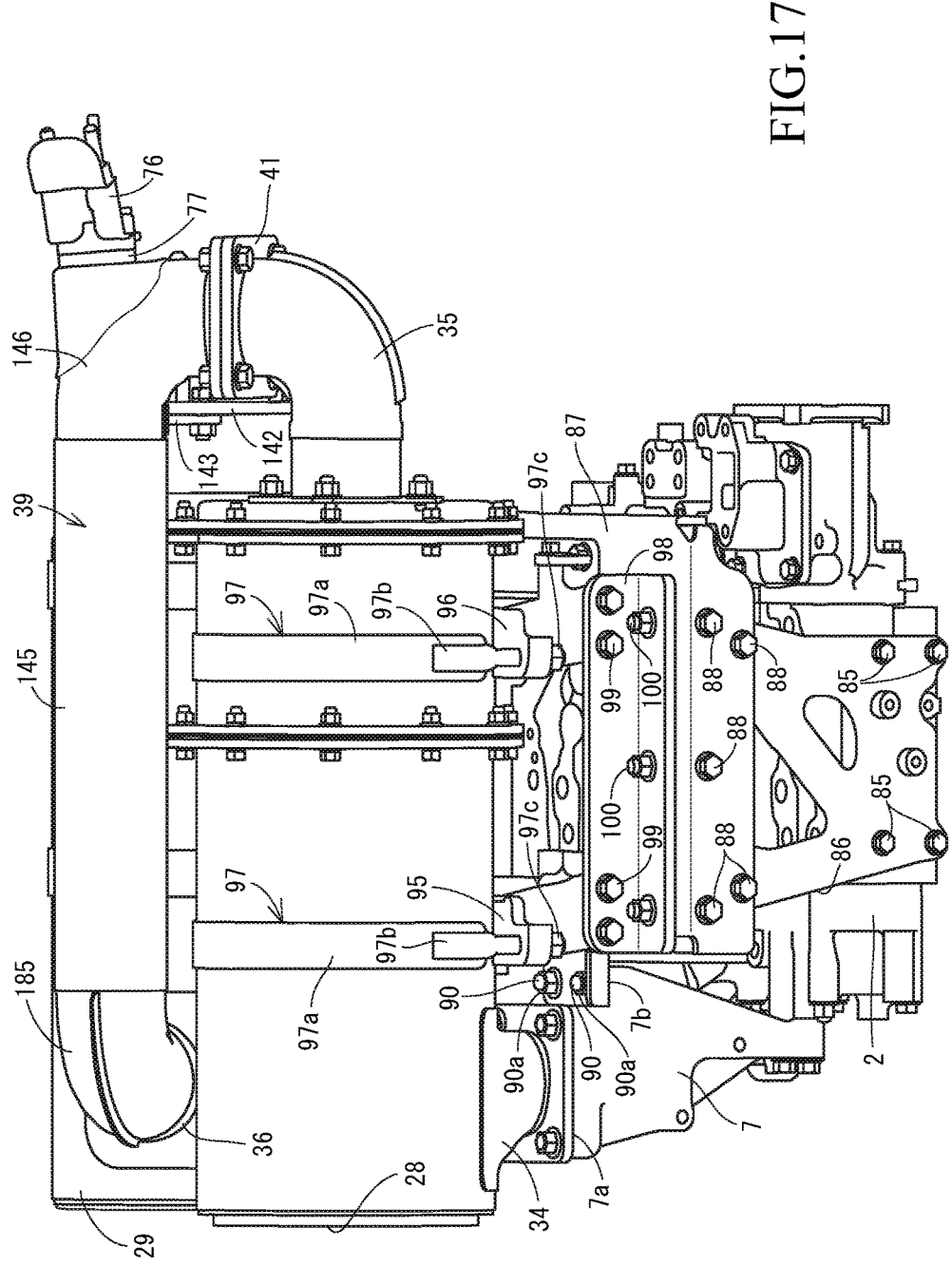
FIG. 17 is an explanatory view of a back elevation of the exhaust gas purification device and a cylinder head support portion.
Figure 18:
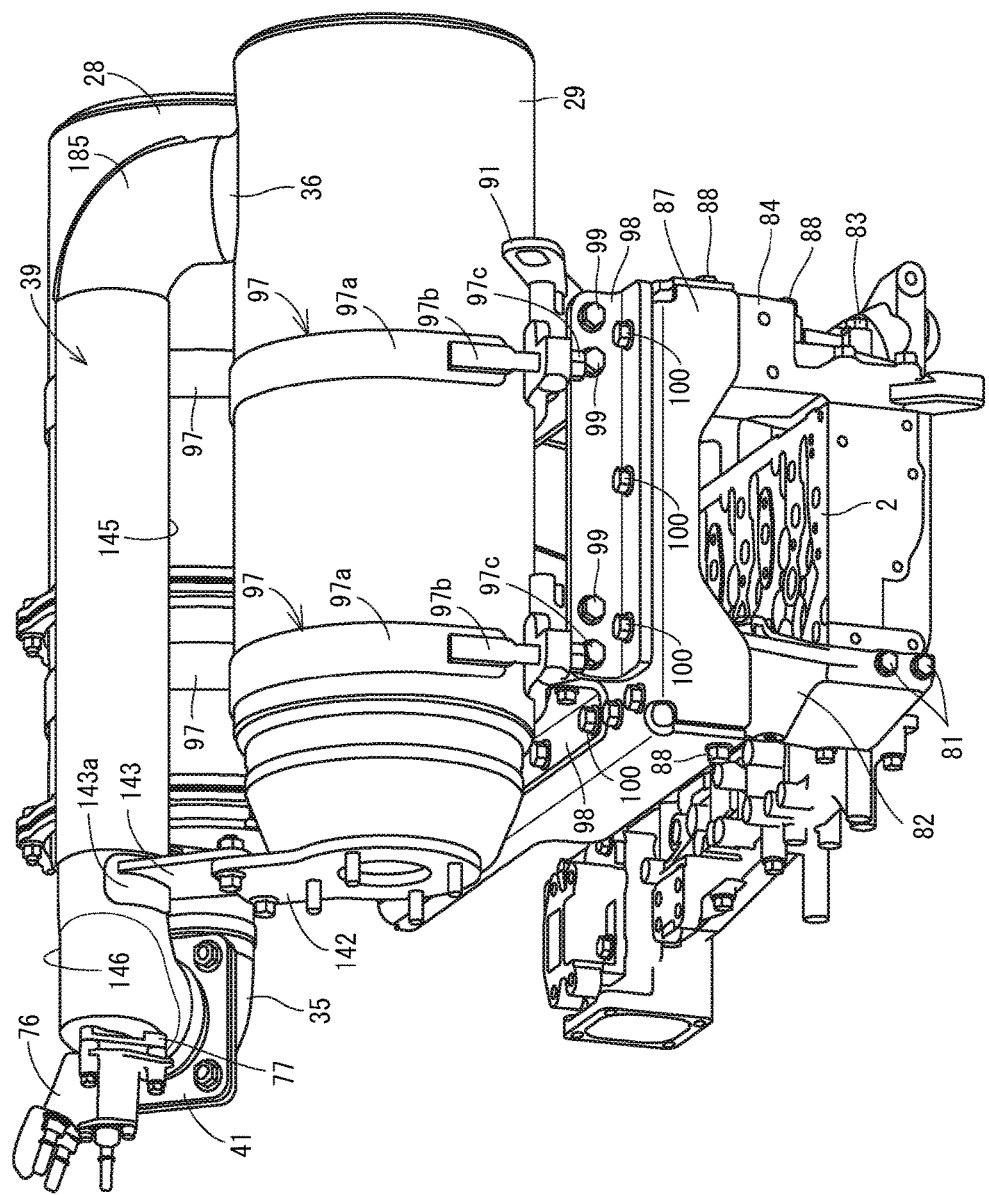
FIG. 18 is an explanatory view of a front surface of the exhaust gas purification device and the cylinder head support portion.
Figure 19:
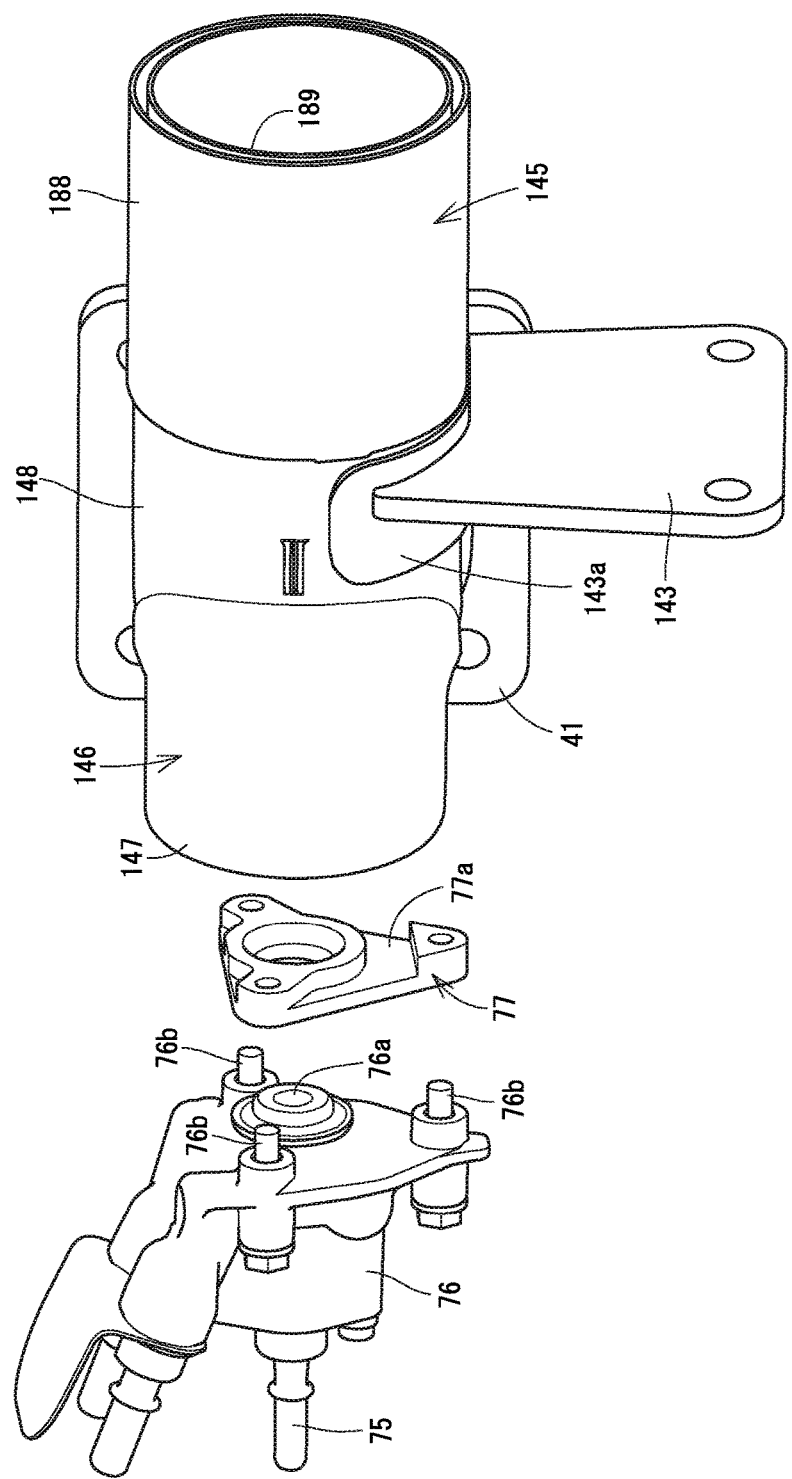
FIG. 19 is an exploded explanatory view of a urea injection portion of the urea mixing pipe.
Figure 20:
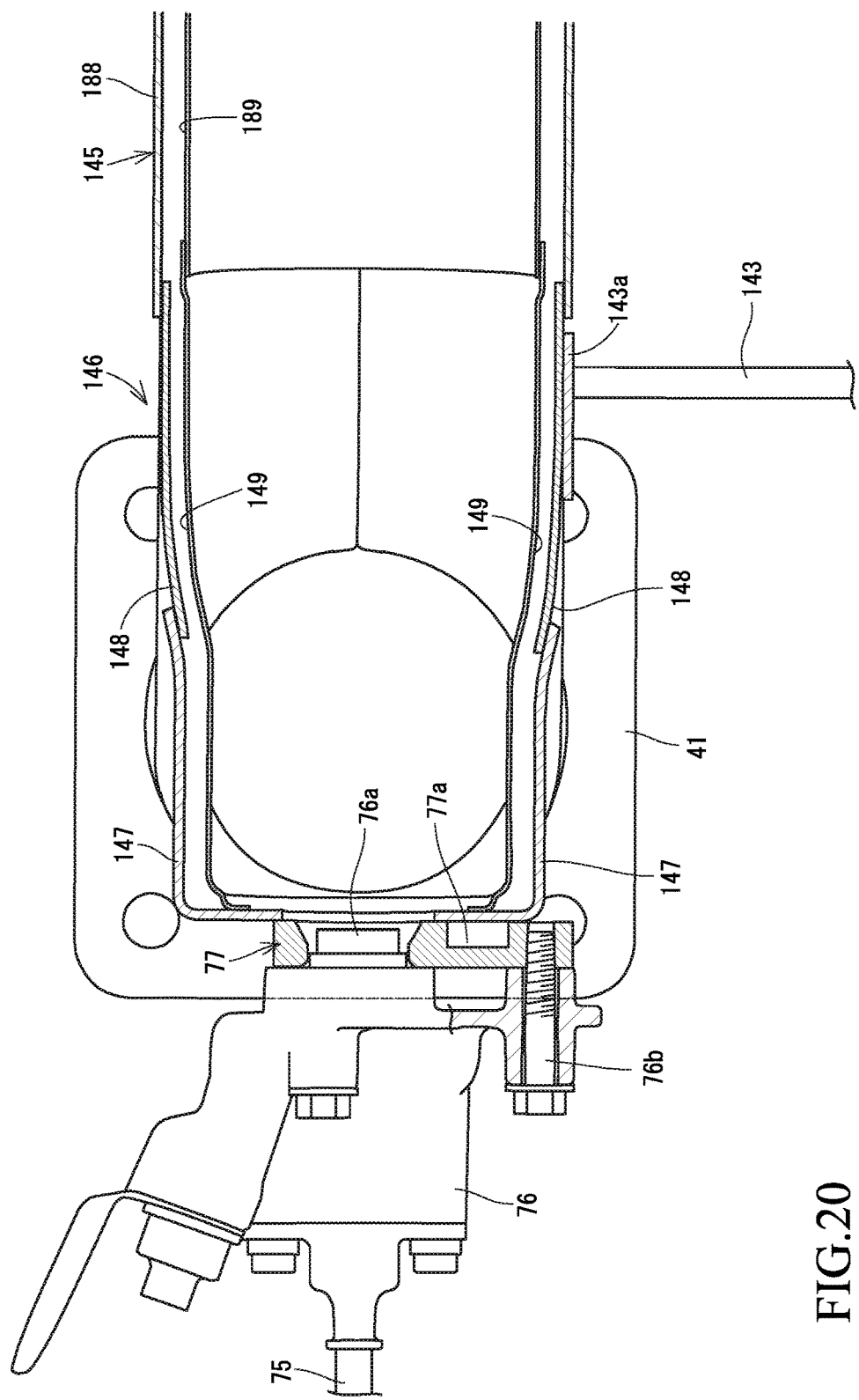
FIG. 20 is an explanatory view of a cross section of the urea injection portion of the urea mixing pipe.

As shown in FIGS. 15 and 16, the elbow tubular portion 185 has an elbow outer pipe 186 which is formed by a pair of halved tube bodies obtained by dividing a cylinder into two sections in a longitudinal direction, and a connection flange portion 186a is formed in the portion by folding end portions in the longitudinal direction of the halved tube bodies of the elbow outer pipe 186 outward. In the same manner, the elbow tubular portion 185 has an elbow inner pipe 187 which is formed by a pair of halved tube bodies obtained by dividing a cylinder into two sections in a longitudinal direction, and a connection flange portion 187a is formed in the portion by folding end portions in the longitudinal direction of the halved tube bodies of the elbow inner pipe 187 outward. Further, the elbow outer pipe 186 and the elbow inner pipe 187 of the elbow tubular portion 185 are integrally formed by pinching the connection flange portion 187a of the elbow inner pipe 187 by the connection flange portion 186a of the elbow outer pipe 186 so as to fix by welding.

As shown in FIG. 15, the straight tubular portion 145 of the urea mixing pipe 39 has a mixing outer pipe 188 and a mixing inner pipe 189 of a double pipe structure. A pipe length of the mixing inner pipe 189 is formed shorter than a pipe length of the mixing outer pipe 188. An exhaust gas inlet side of the elbow inner pipe 187 is protruded out of a cylindrical opening in an exhaust gas inlet side of the elbow outer pipe 186 in the elbow tubular portion 185, the exhaust gas inlet side of the elbow outer pipe 186 is fixed by welding to an exhaust gas outlet side of the mixing outer pipe 188, and the exhaust gas inlet side of the elbow tubular portion 185 is connected to the exhaust gas outlet side of the straight tubular portion 145 by fixing by welding the exhaust gas inlet side of the elbow inner pipe 187 to the exhaust gas outlet side of the mixing inner pipe 189. More specifically, the exhaust gas inlet side of the elbow tubular portion 185 is integrally connected to the exhaust gas outlet side of the urea mixing pipe 39.

In addition, the exhaust gas outlet side of the elbow inner pipe 187 is protruded out of the cylindrical opening in the exhaust gas outlet side of the elbow outer pipe 186 in the elbow tubular portion 185, the exhaust gas outlet side of the elbow outer pipe 186 is fixed by welding to the exhaust gas inlet side of the SCR inlet pipe 36, and an exhaust gas inlet side of an extension pipe 190 is fixed by welding to the exhaust gas outlet side of the elbow inner pipe 187.

Further, as shown in FIG. 15, the second case 29 is formed into a double pipe structure by an inner case 136 and an outer case 137. An SCR catalyst 32 and an oxidation catalyst 33 for urea selective catalyst reducing are accommodated in the inner case 136. An outer peripheral side of the inner case 136 and an inner peripheral side of the outer case 137 are connected via a support body 138 having a ring shape and made of a thin plate. A case heat insulation material 139 made of heat resisting fiber is filled between the outer peripheral side of the inner case 136 and the inner peripheral side of the outer case 137.

As shown in FIG. 15, an inlet side lid body 135 is fixed by welding to one end side (an end portion in an exhaust gas upstream side) of the inner case 136 and the outer case 137. One end sides of tubular opening portions of the inner case 136 and the outer case 137 are closed by the inlet side lid body 135. Further, exhaust gas inlets 133 and 134 are formed in the inner case 136 and the outer case 137 between the SCR catalyst 32 accommodation portion and the inlet side lid body 135. The exhaust gas inlet 134 of the outer case 137 is formed larger in diameter than the exhaust gas inlet 133 of the inner case 136, and the exhaust gas outlet side of the SCR inlet pipe 36 is fixed by welding to the outer peripheral side of the exhaust gas inlet 133 of the inner case 136.

More specifically, the inner tube 187 of the elbow tubular portion 185 is formed smaller in diameter than the inlet opening of the inner case 136, and the outlet opening of the SCR inlet pipe 36 is formed larger in diameter than the inlet opening of the SCR inlet pipe 36. The SCR inlet pipe 36 is passed through the exhaust gas inlet 134 of the outer case 137, and the inner portion of the SCR inlet pipe 36 is communicated with the inner side of the inner case 136. An exhaust gas supply chamber 140 of the second case 29 is formed in an inner portion of the inner case 136 between the SCR catalyst 32 and the inlet side lid body 135, and the exhaust gas outlet side of the inner pipe 187 in the elbow tubular portion 185 is protruded out of the exhaust gas inlet side of the extension pipe 190 protruded to the exhaust gas outlet side of the SCR inlet pipe 36, toward an inner portion of the exhaust gas supply chamber 140.

According to the structure mentioned above, the exhaust gas supply chamber 140 of the second case 29 is formed between an exhaust gas acceptance end surface of the SCR catalyst 32 and the inlet side lid body 135 obtained by depressing an opposing surface to the SCR catalyst 32 into a concave surface. The exhaust gas mixed with the urea water as the ammonia is put into the exhaust gas supply chamber 140 from the inner pipe 187 of the elbow tubular portion 185, and the exhaust gas is passed to the inner portions of the SCR catalyst 32 and the oxidation catalyst 33, thereby reducing the nitrogen oxides (NOx) in the exhaust gas which is discharged out of the SCR outlet pipe 37 of the second case 29.

As shown in FIGS. 1, 15, and 16, in the engine device having the urea mixing pipe 39 which injects the urea water into the exhaust gas of the engine 1, and the second case 29 serving as the SCR case which removes the nitrogen oxides in the exhaust gas of the engine 1, and in which the inlet side of the second case 29 is connected to the outlet side of the urea mixing pipe 39, the engine device being structured such that the urea mixing pipe 39 is formed by the elbow outer pipe 186 and the elbow inner pipe 187 having the double pipe structure, and the second case 29 is formed by the inner case 136 body and the outer case 137 body having the double case structure, the exhaust gas outlet side end portion of the elbow outer pipe 186 is connected to the exhaust gas inlet 133 of the inner case 136 body, and the exhaust gas outlet side end portion of the elbow inner pipe 187 is protruded to the inner portion of the second case 29. Therefore, it is possible to prevent the elbow inner pipe 187 from coming into contact with the outside air, and it is possible to reduce the formation of the crystal lump of the urea component in the inner hole surface of the elbow inner pipe 187. It is possible to easily prevent the exhaust gas resistance of the elbow inner pipe 187 from being increased by the growth of the urea crystal lump.

As shown in FIG. 15, the exhaust gas outlet side end portion of the elbow outer pipe 186 is formed larger in diameter than the inlet opening of the inner case 136 body, and the exhaust gas outlet side end portion of the elbow outer pipe 186 is fixed by welding to the outer peripheral surface of the inner case 136 body. Therefore, the exhaust gas outlet side end portion of the elbow outer pipe 186 can be connected to the outer peripheral surface which is spaced from the inlet opening edge of the inner case 136 body in the outer peripheral surface of the inner case 136 body. More specifically, the elbow outer pipe 186 (the exhaust gas outlet side end portion) can be firmly fixed easily by welding process to the outer peripheral surface of the inner case 136 body while preventing the deformation of the inner case 136 body, and the exhaust gas outlet side end portion of the elbow outer pipe 186 can be connected with high rigidity to the outer peripheral surface of the inner case 136 body so as to be spaced from the inlet opening edge of the inner case 136 body, thereby improving a connection strength between the outer peripheral surface of the inner case 136 body and the exhaust gas outlet side end portion of the elbow outer pipe 186.

As shown in FIGS. 15 and 16, the elbow outer pipe 186 and the elbow inner pipe 187 are formed into a split structure, and are integrally structured by pinching a split connection portion of the elbow inner pipe 187 by a split connection portion of the elbow outer pipe 186. Therefore, it is not necessary to specially arrange a support member of the elbow inner pipe 187, and it is possible to prevent the crystal lump of the urea component from being formed in the vicinity of the exhaust gas inlet of the second case 29 while simplifying the pipe structure. It is possible to easily prevent contact between the exhaust gas outlet side end portion of the elbow inner pipe 187 which is protruded out of the elbow outer pipe 186 into the inner portion of the second case 29, and the exhaust gas inlet opening edge of the second case 29.

As shown in FIG. 15, the exhaust gas outlet side of the SCR inlet pipe 36 serving as the exhaust gas inlet pipe is firmly fixed to the inlet opening portion of the inner case 136 body, the exhaust gas inlet side of the SCR inlet pipe 36 is firmly fixed to the exhaust gas outlet side end portion of the elbow outer pipe 186, the exhaust gas inlet side of the extension pipe 190 is connected to the exhaust gas outlet side end portion of the elbow inner pipe 187, and the exhaust gas outlet side of the extension pipe 190 is protruded into the inner portion of the inner case 136 body. Therefore, the urea mixing pipe 39 can be connected to the second case 29 without bringing the elbow inner pipe 187 (the exhaust gas) into contact with the connection portion (the exhaust gas inlet pipe) between the second case 29 and the elbow outer pipe 186, and it is possible to prevent the urea crystal lump from being formed in the vicinity of the second case 29 inlet (the connection portion with the urea mixing pipe 39).

Further, as shown in FIG. 15, the exhaust gas outlet side of the inner case 136 is protruded out of the exhaust gas outlet side of the outer case 137 of the second case 29, and the outlet side lid body 141 is connected by weld fixation to the exhaust gas outlet side of the inner case 136. The outlet side lid body 141 is formed by a frustum shaped cylinder in which a diameter in the exhaust gas outlet side to which the SCR outlet pipe 37 is connected, is smaller than a diameter in the exhaust gas inlet side connected to the inner case 136. A tabular support stay body 142 is arranged in an outer side surface of the exhaust gas outlet of an outlet side lid body 141, and the SCR outlet pipe 37 and the support stay body 142 are fastened by bolts 143 to the outlet side lid body 141. The tabular support stay body 142 may be fixed by welding to the outer side surface of the exhaust gas outlet of the outlet side lid body 141.

As shown in FIGS. 6, 11, 12, and 15, one end side of the support stay body 142 is extended in an outer peripheral direction of the second case 29, one end side of a mixing pipe support body 143 is fastened by bolts 144 to an extension end portion of the support stay body 142, a receiving portion 143*a* is provided in the other end side of the mixing pipe support body 143, the receiving portion 143*a* of the mixing pipe support body 143 is fixed by welding to a urea water injection portion 146 of the urea mixing pipe 39, and the urea water injection portion 146 of the urea mixing pipe 39 is supported to the exhaust gas outlet side of the second case 29 via the support stay body 142 and the mixing pipe support body 143.

Figure 11:
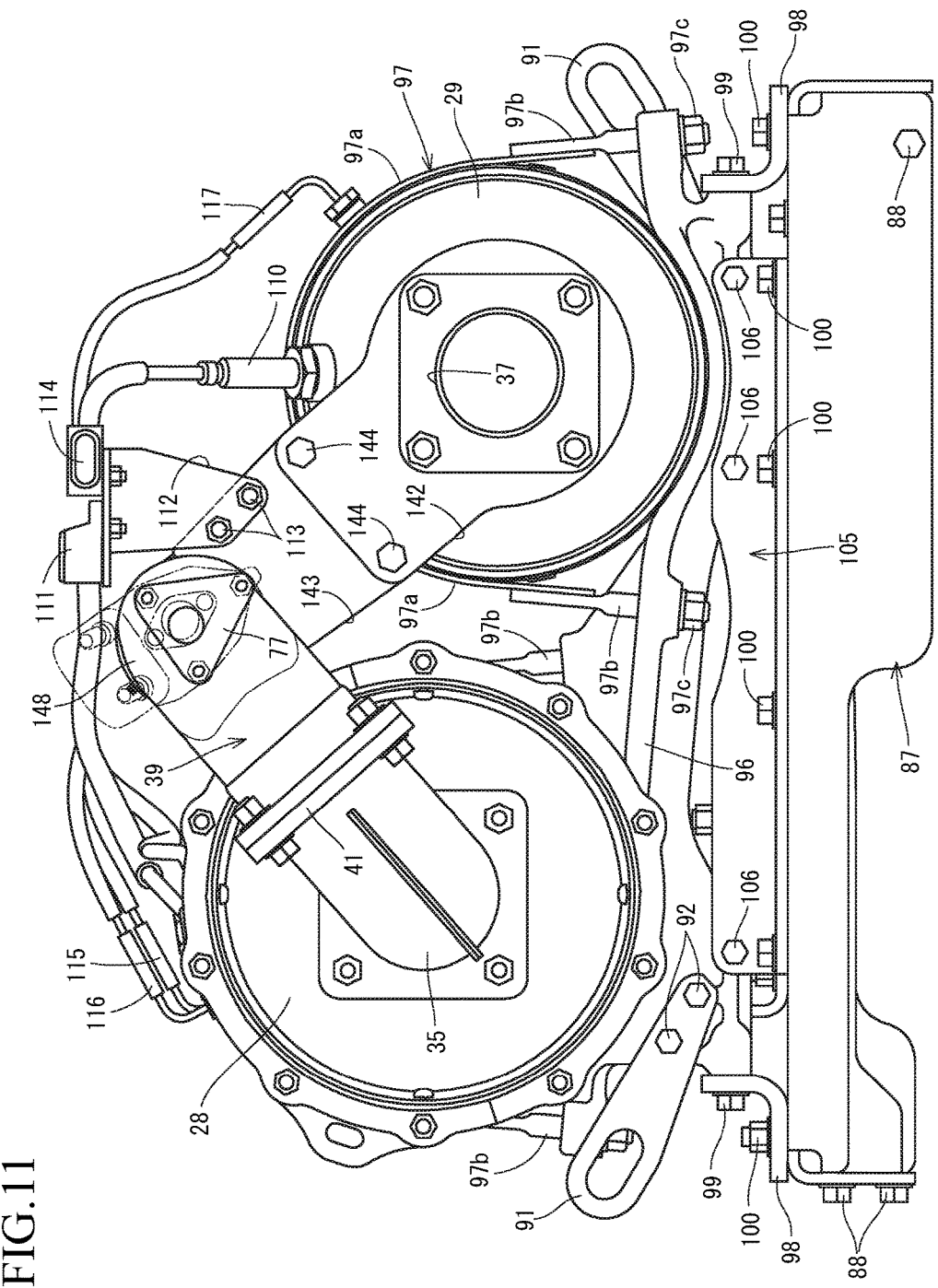
FIG. 11 is a right side elevational view of the exhaust gas purification device.
Figure 12:
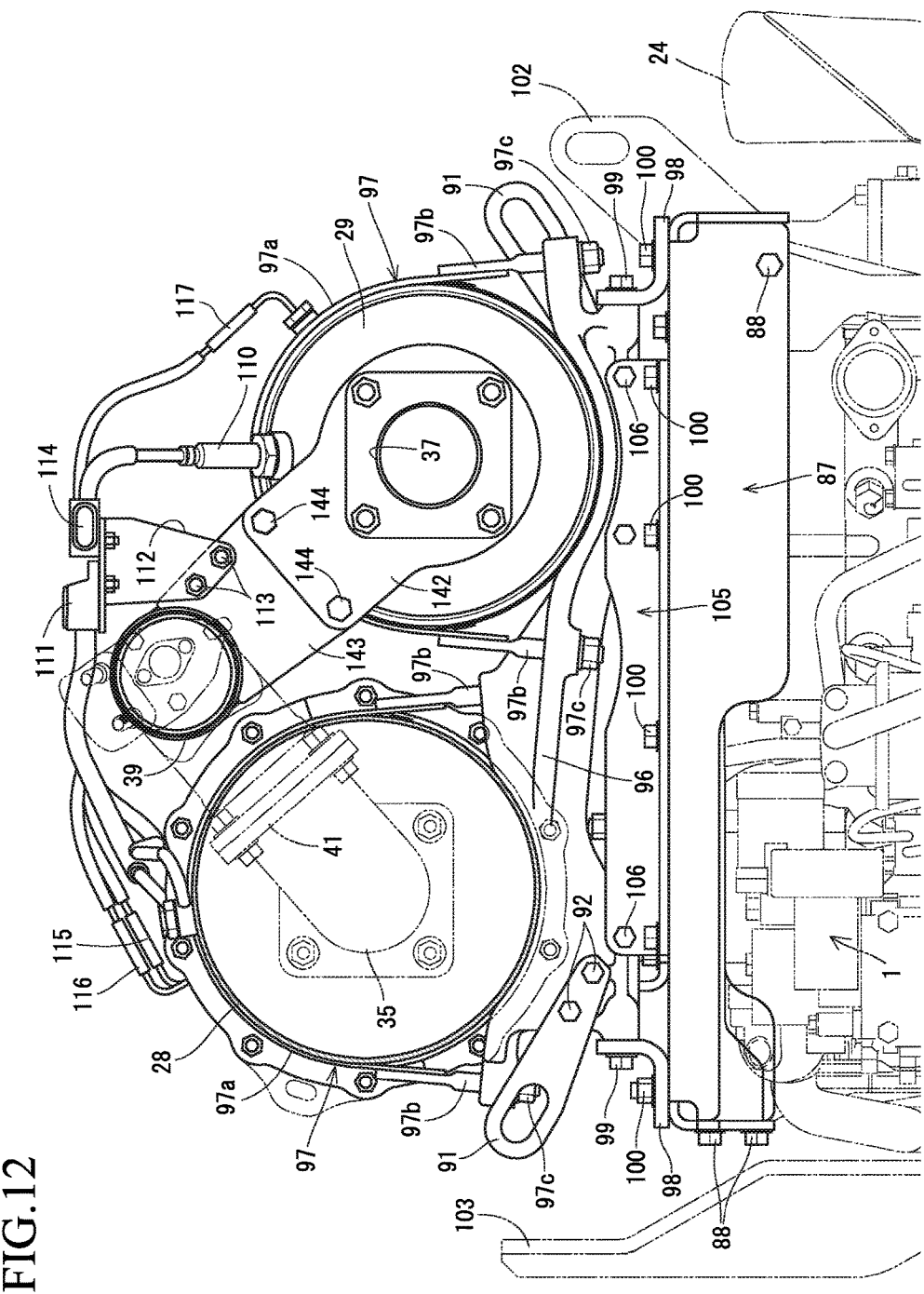
FIG. 12 is an explanatory view of a right side cross section of the exhaust gas purification device.
Figure 13:
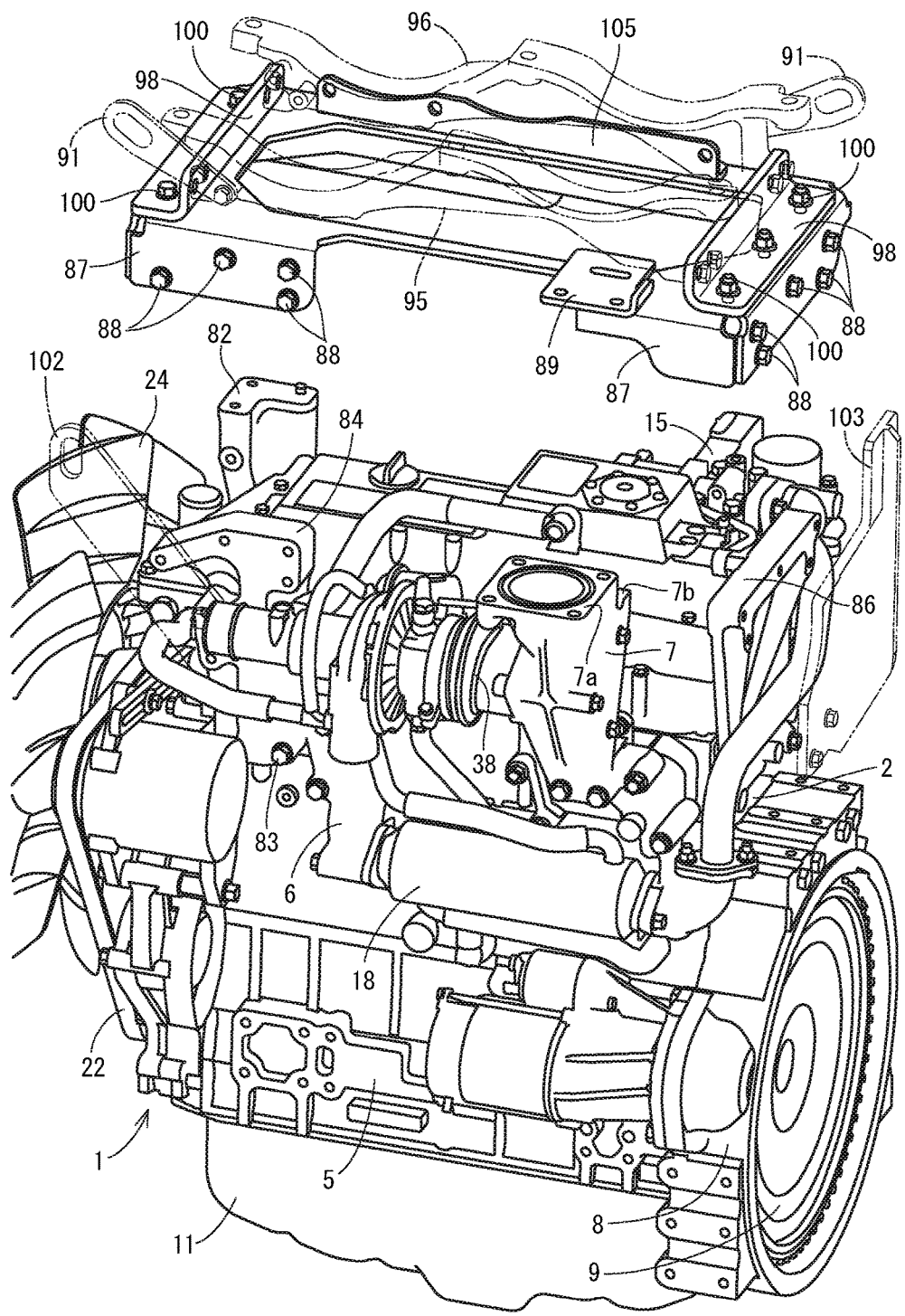
FIG. 13 is an exploded explanatory view of a support base portion of the exhaust gas purification device.
Figure 14:
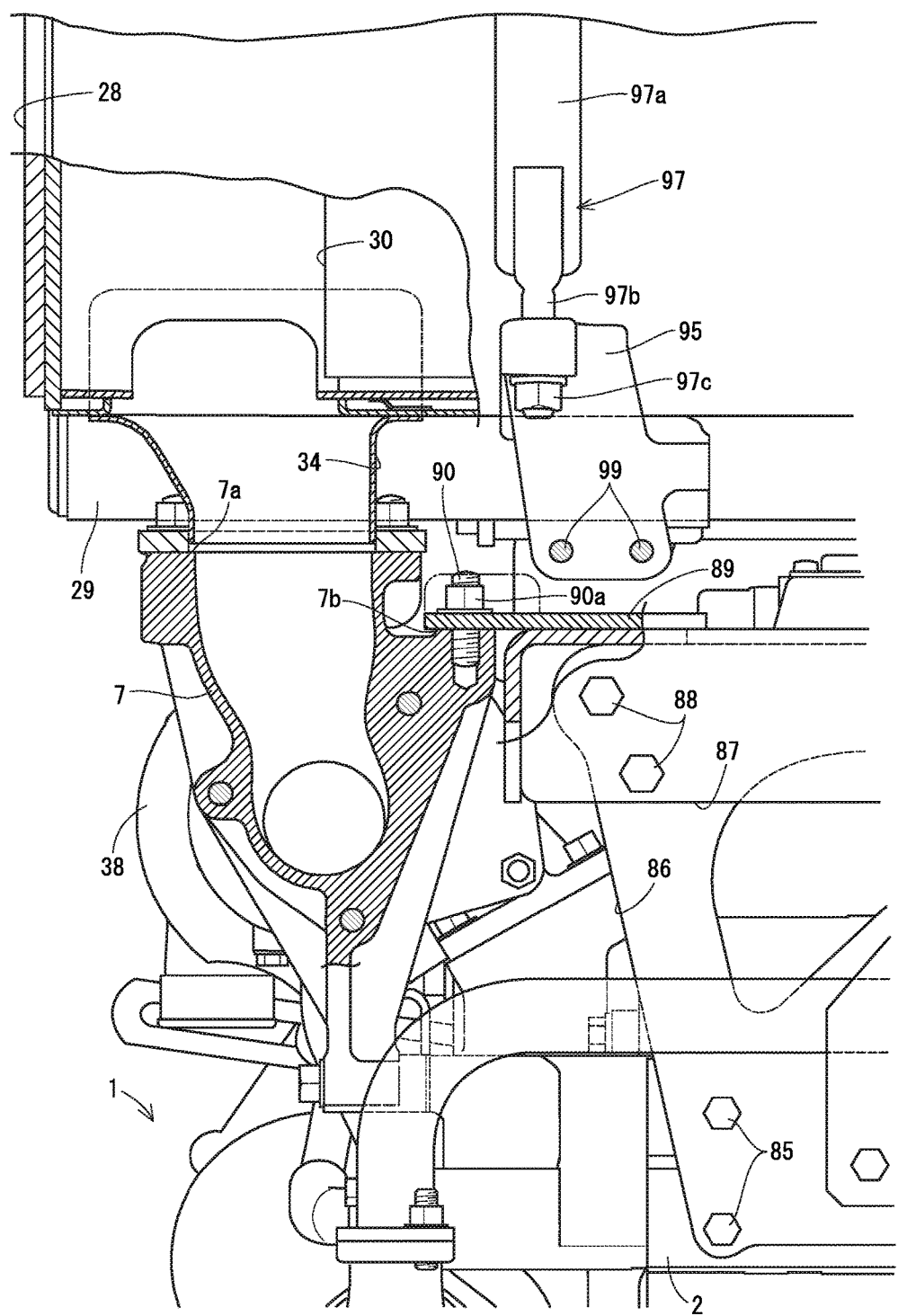
FIG. 14 is an explanatory view of a cross section of the support base portion of the exhaust gas purification device.

Meanwhile, as shown in FIGS. 11 and 12, the first case 28 is provided with DPF temperature sensors 115 and 116 which detect temperature of the exhaust gas in the vicinity of the oxidation catalyst 30 within the first case 28, and a DPF differential pressure sensor 111 which detects pressure of the exhaust gas of the soot filter 31 within the first case 28, and the second case 29 is provided with an SCR temperature sensor 117 which detects temperature of the exhaust gas inlet of the second case 29, and an NOx remaining sensor 110 which detects the nitrogen oxides (NOx) in the exhaust gas in the exhaust gas outlet side of the second case 29. A sensor bracket 112 is fastened by bolts 113 to the mixing pipe support body 143, and a wiring connector 114 electrically connected to each of the temperature sensors 115, 116, and 117 and the DPF differential pressure sensor 111 are attached to the sensor bracket 112.

More specifically, since the residual volume of the particulate matters in the exhaust gas collected by the soot filter 31 is in proportion to the differential pressure of the exhaust gas, a soot filter regeneration control (for example, a fuel injection control or an intake air control of the diesel engine 1 for raising the temperature of the exhaust gas) is executed on the basis of results of detection of the differential pressure sensor 111 when an amount of the particulate matters remaining in the soot filter 31 is increased to a predetermined amount or more, the soot filter regeneration control reducing the amount of the particulate matters in the soot filter 31. Meanwhile, a urea water injection control is executed on the basis of results of detection of the NOx remaining sensor 110, the urea water injection control adjusting an amount of the urea water solution injected into the inner portion of the urea mixing pipe 39.

Further, as shown in FIGS. 17 and 19 to 22, there are provided with a urea water injection pump 73 which pressure feeds the urea water solution within a urea water tank 71, an electric motor 74 which drives the urea water injection pump 73, and a urea water injection body 76 which is connected to the urea water injection pump 73 via the urea water injection pipe 75. A urea water injection body 76 is attached to a urea water injection portion 146 of the urea mixing pipe 39 via an injection pedestal 77, and the urea water solution is sprayed into an inner portion of the urea mixing pipe 39 from the urea water injection body 76. The urea water injection portion 146 has an outer shell case 147 to which the injection pedestal 77 is fixed by welding, an outside connection pipe 148 which connects an exhaust gas inlet side of the mixing outer pipe 188 to an exhaust gas outlet side of the outer shell case 147, and a double pipe inside connection pipe 149 which is inward provided in the outer shell case 147 and the outside connection pipe 148. The exhaust gas inlet side of the inside connection pipe 149 is connected to the exhaust gas outlet side of the DPF outlet pipe 35 (a double pipe structure), and the exhaust gas inlet side of the mixing inner pipe 189 is connected to the exhaust gas outlet side of the inside connection pipe 149, thereby introducing the exhaust gas of the DPF outlet pipe 35 into the inner portion of the mixing inner pipe 189.

Further, a heat shielding concave portion 77a is formed in an adhesion surface of the injection pedestal 77 which is fixed by welding to the outer shell case 147, and the urea water injection body 76 is fastened by bolts 76b to the injection pedestal 77 which is fixed by welding to the outer shell case 147, thereby making the heat shielding concave portion 77a be spaced from a weld fixing surface of the outer shell case 147, forming the injection pedestal 77 with less adhesion area in relation to the weld fixing surface of the outer shell case 147, shielding heat of the outer shell case 147 heated by the exhaust gas by the heat shielding concave portion 77a, and preventing the injection pedestal 77 from being heated by the heat of the outer shell case 147. More specifically, it is possible to reduce transmission of the exhaust heat of the outer shell case 147 to the urea water injection body 76, and it is possible to protect a urea water injection valve 76a of the urea water injection body 76, the urea water injection pipe 75 which is communicated with and connected to the urea water injection valve 76a, or a control harness (not shown) which is electrically connected to the urea water injection valve 76a.

Figure 22:
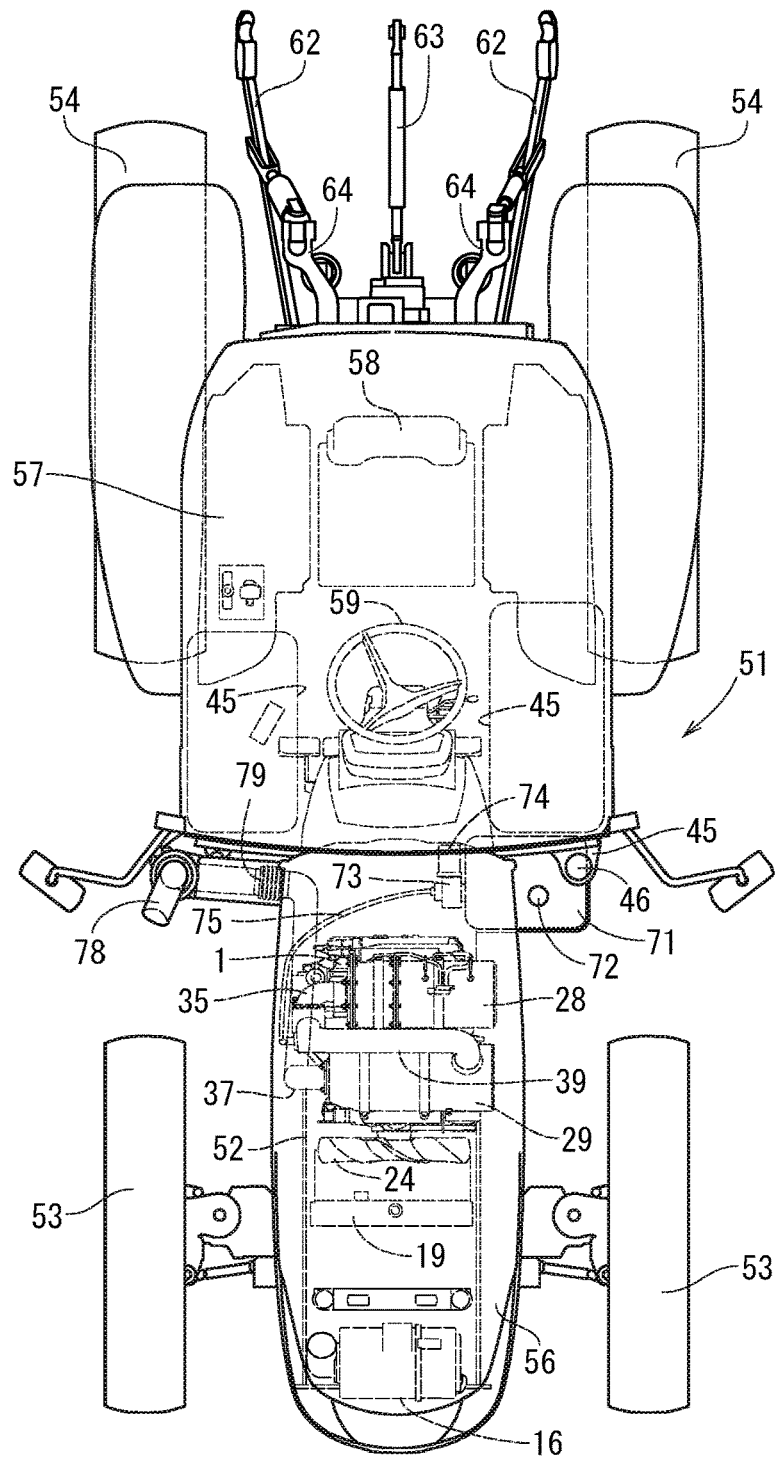
FIG. 22 is a plan view of the same.

Next, a description will be given of a tractor 51 which mounts the diesel engine 1 thereon with reference to FIGS. 21 and 22. The tractor 51 serving as the working vehicle shown in FIGS. 21 and 22 is adapted to perform a tilling work for tilling a farm field by being installed a tilling work machine (not shown). FIG. 21 is a side elevational view of a tractor for an agricultural work, and FIG. 22 is a plan view of the same. In the following description, a left side in a direction toward a forward moving direction of the tractor is simply called as a left side, and a right side in the direction toward the forward moving direction is simply called as a right side.

As shown in FIGS. 21 and 22, the tractor 51 for the agricultural work serving as the working vehicle is adapted to travel forward and backward by supporting a travel machine body 52 by a pair of right and left front wheels 53 and a pair of right and left rear wheels 54, mounting the diesel engine 1 to a front portion of the travel machine body 52, and driving the rear wheels 54 and the front wheels 53 by the diesel engine 1. The upper surface side and both the right and left side surfaces of the diesel engine 1 are covered with a hood 56 which can be opened and closed.

Further, a cabin 57 which an operator gets on board is installed in a rear side of the hood 56 among the upper surface of the travel machine body 52. An inner portion of the cabin 57 is provided with a control seat 58 on which the operator seats, and control instruments such as a control steering wheel 59 serving as a steering means. Further, a pair of right and left steps 60 for the operator to get on and off are provided in right and left outside portions of the cabin 57, and a fuel tank 45 for supplying the fuel to the diesel engine 1 is provided in a lower side of a bottom portion of the cabin 57 and inside the step 60.

Further, the travel machine body 52 is provided with a transmission case 61 for changing speed of the output from the diesel engine 1 so as to transmit it to the rear wheels 54 (the front wheels 53). The tilling work machine (not shown) is coupled to a rear portion of the transmission case 61 via a lower link 62, a top link 63, and a lift arm 64 so as to be movable up and down. Further, a PTO shaft 65 driving the tilling work machine is provided in a rear side surface of the transmission case 61. The travel machine body 52 of the tractor 51 is constructed by the diesel engine 1, the transmission case 61, and a clutch case 66 coupling them.

In addition, the exhaust gas purified by the second case 29 is discharged from a tail pipe 78 toward an upper side of the cabin 57 by disposing the tail pipe 78 in a rising manner on a front surface of a right corner portion of the cabin 57 in the front surface of the cabin 57, extending a lower end side of the tail pipe 78 toward an inner portion of the hood 56, and connecting a lower end side of the tail pipe 78 to the SCR outlet pipe 37 via a bellows tubular flexible pipe 79, as shown in FIGS. 21 and 22. The machine vibration transmitted to the tail pipe 78 side from the diesel engine 1 side is reduced by the connection of the flexible pipe 79. Further, a urea water tank 71 is installed to a left side portion of the hood 56 in an opposite side to a right side portion where the tail pipe 78 is arranged, in the front surface of the cabin 57. More specifically, the urea water tank 71 is arranged in a sorting manner in the left side portion of the rear portion of the hood 56 while the tail pipe 78 is arranged in the right side portion of the rear portion of the hood 56.

Further, the urea water tank 71 is mounted to the travel machine body 52 (a bottom portion frame of the cabin 57) in the leftward rear portion of the hood 56. An oil hole 46 of the fuel tank 45 and a water filler 72 of the urea water tank 71 are adjacently provided in a lower portion of a front surface in the left side of the cabin 57. The tail pipe 78 is arranged in the front surface in the right side of the cabin 57 where an operator gets on and off with low frequency, and the oil hole 46 and the water filler 72 are arranged in the front surface in the left side of the cabin 57 where the operator gets on and off with high frequency. The cabin 57 is structured such that the operator can get on and off the control seat 58 from any of the left side and the right side.

According to the structure mentioned above, the carbon monoxide (CO) and the carbon hydride (HC) in the exhaust gas of the diesel engine 1 can be reduced by the oxidation catalyst 30 and the soot filter 31 within the first case 28. Next, the urea water from the urea water injection valve 76a is mixed into the exhaust gas from the diesel engine 1 in the inner portion of the urea mixing pipe 39. Further, the nitrogen oxides (NOx) in the exhaust gas mixed with the urea water as ammonia is reduced by the SCR catalyst 32 and the oxidation catalyst 33 within the second case 29, and is discharged out of the tail pipe 78 toward the machine outside.

Figure 23:
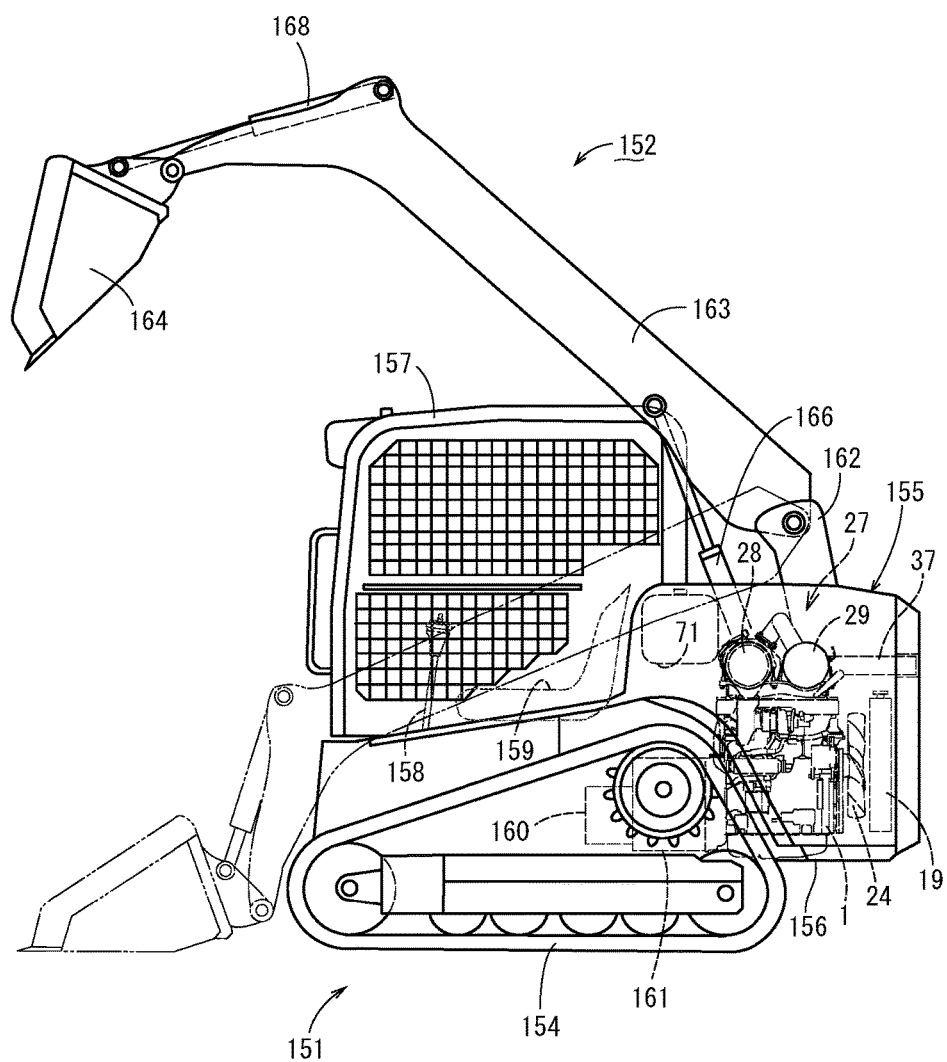
FIG. 23 is a side elevational view of a working vehicle which mounts a diesel engine thereto.
Figure 24:
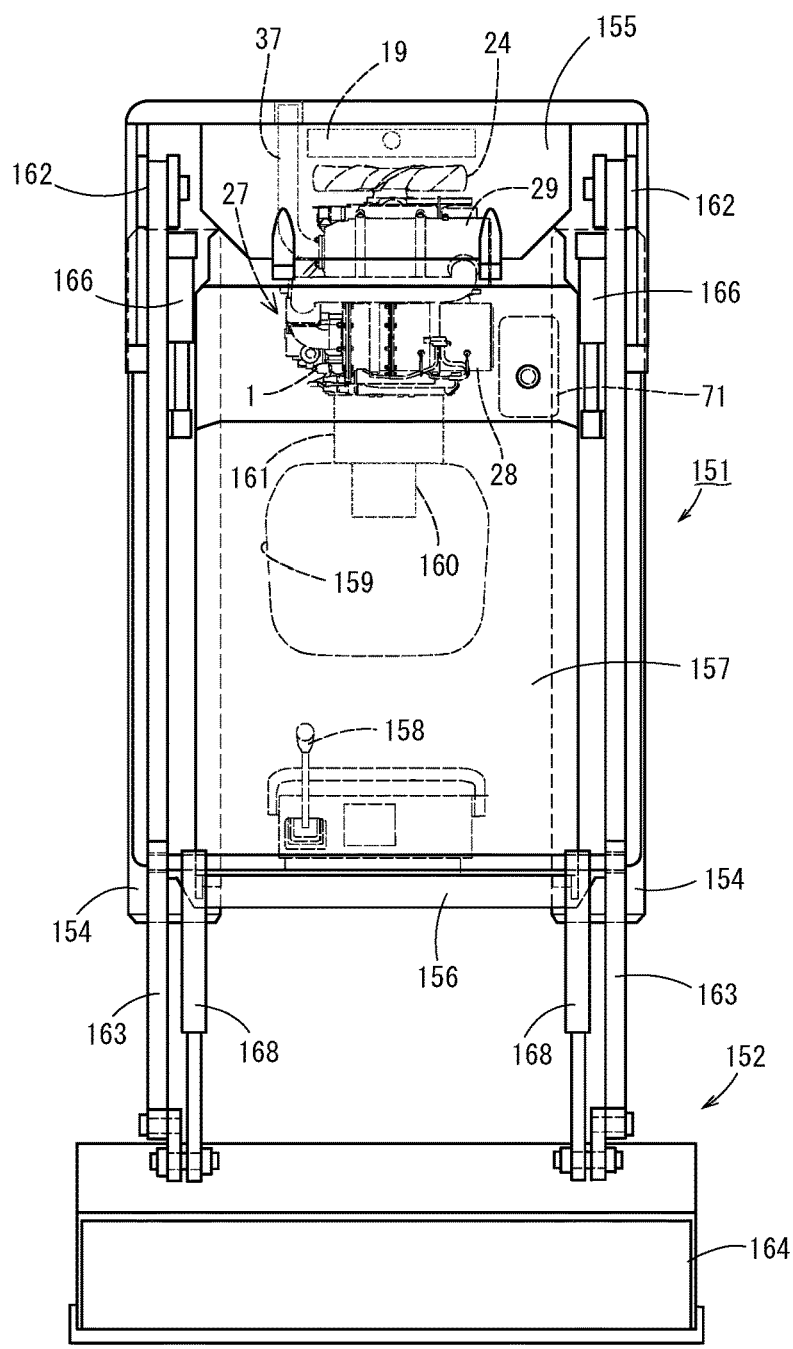
FIG. 24 is a plan view of the working vehicle.

Next, a description will be given of a skid steer loader 151 which mounts the diesel engine 1 thereon, with reference to FIGS. 23 and 24. The skid steer loader 151 shown in FIGS. 23 and 24 and serving as the working vehicle installs a loader device 152 mentioned later thereto and is adapted to carry out a loading work. Right and left travel crawler portions 154 are installed to the skid steer loader 151. Further, an openable hood 155 is arranged above the travel crawler portions 154 of the skid steer loader 151. The diesel engine 1 is accommodated within the hood 155. The first case 28 and the second case 29 are mounted on and fixed to the upper surface portion of the diesel engine 1.

The diesel engine 1 is supported to a travel machine body 156 provided in the skid steer loader 151 via a vibration isolation member. A cabin 157 which a driver gets on board is arranged in front of the hood 155, and a control steering wheel 158 and a driver seat 159 are provided in an inner portion of the cabin 157. Further, there are provided a loading work hydraulic pump device 160 which is driven by the diesel engine 1, and a travel transmission device 161 which drives the right and left travel crawler portion 154. The power from the diesel engine 1 is transmitted to the right and left travel crawler portions 154 via the travel transmission device 161. An operator seating on the driver seat 159 can carry out a traveling operation of the skid steer loader 151 via a control portion such as the control steering wheel 158.

Further, the loader device 152 has loader posts 162 which are arranged both right and left sides of the travel machine body 156, a pair of right and left lift arms 163 which are connected to upper ends of the loader posts 162 so as to be freely oscillated up and down, and a bucket 164 which is connected to leading end portions of the right and left lift arms 163 so as to be freely oscillated up and down.

Lift cylinders 166 for oscillating up and down the lift arms 163 are respectively provided between the loader posts 162 and the corresponding lift arms 163. Bucket cylinders 168 for oscillating up and down the bucket 164 are provided between the right and left lift arms 163 and the bucket 164. In this case, a hydraulic force of the loading work hydraulic pump device 160 is controlled according to an operation of a loader lever (not shown) by the operator on the control seat 159, the lift cylinders 166 and the bucket cylinders 168 are actuated to be expanded and contracted, and oscillate up and down the lift arms 163 and the bucket 164, and the loading work is adapted to be executed. The urea water tank 71 is inward provided in an upper portion in a forward lateral side of the hood 155. Further, the radiator 19 arranged so as to be opposed to the cooling fan 24 is inward provided in a rear portion of the hood 155.

The embodiments of the present invention relates to an engine device such as a diesel engine which is mounted to an agricultural machine (a tractor and a combine harvester) or a construction machine (a bulldozer, a hydraulic excavator, and a loader), and more particularly to an engine device to which an exhaust gas purification device is mounted, the exhaust gas purification device removing particulate matters (soot and particulate) included in exhaust gas, or nitrogen oxides (NOx) included in the exhaust gas.

What is claimed is:

1. An engine device comprising:
   a urea mixing pipe configured to inject urea water into exhaust gas of an engine, the urea mixing pipe having:
      an outer pipe defining a channel and comprising an exhaust gas outlet side end portion having a first diameter; and
      an inner pipe at least partially disposed within the channel of the outer pipe and comprising an exhaust gas outlet side end portion; and
   an SCR case coupled to the urea mixing pipe and configured to remove nitrogen oxides in the exhaust gas of the engine, the SCR case comprising:
      an outer case body defining a cavity; and
      an inner case body at least partially disposed within the cavity and defining an exhaust gas inlet opening having a second diameter, the first diameter of the exhaust gas outlet side end portion is greater than the second diameter of the exhaust gas inlet opening; and
   wherein the exhaust gas outlet side end portion of the outer pipe is fixed to an outer peripheral surface of the inner case body.

2. The engine device according to claim 1, wherein:
   the first diameter comprises a diameter of an outer peripheral surface of the exhaust gas outlet side end portion of the urea mixing pipe, and
   the exhaust gas outlet side end portion of the outer pipe is fixed by welding to the outer peripheral surface of the inner case body.

3. The engine device according to claim 1, further comprising:
   an SCR inlet pipe comprising:
      an exhaust gas outlet side of the SCR inlet pipe is firmly fixed to the exhaust gas inlet opening of the inner case body, and
      an exhaust gas inlet side of the SCR inlet pipe is firmly fixed to the exhaust gas outlet side end portion of the outer pipe, and an extension portion:
an exhaust gas inlet side of an extension pipe is connected to the exhaust gas outlet side end portion of the inner pipe, and
an exhaust gas outlet side of the extension pipe protrudes into an inner portion of the inner case body.

4. The engine device according to claim 1, wherein the exhaust gas outlet side end portion of the inner pipe is provided in a protruding manner in an inner portion of the SCR case.

5. An engine device comprising:
a urea mixing pipe configured to inject urea water into an exhaust gas, the urea mixing pipe comprising:
an outer pipe defining a channel; and
an inner pipe at least partially disposed within the channel;
an SCR case configured to remove nitrogen oxides in the exhaust gas, the SCR case comprising:
an outer case body defining a cavity; and
an inner case body at least partially disposed within the cavity, the inner case body comprising an inner surface and an outer surface, and defining an opening; and
an SCR inlet pipe comprising:
a first end coupled to the outer pipe of the urea mixing pipe; and
a second end fixed to the outer surface of the inner case body and interposed between the outer case body and the inner case body.

6. The engine device of claim 5, wherein the second end of the SCR inlet pipe is welded to the outer surface of the inner case body.

7. The engine device of claim 5, wherein at least a portion of the second end of the SCR inlet pipe extends between the outer case body and the inner case body.

8. The engine device of claim 5, further comprising an extension pipe coupled to the inner pipe of the urea mixing pipe via a first end of the extension pipe, wherein at least a portion of extension pipe is positioned within the opening of the inner case body and a second end of the extension pipe is positioned within another cavity defined by the inner case body.

9. The engine device of claim 8, wherein the outer case body of the SCR case defines an opening aligned with the opening defined by the inner case body.

10. The engine device of claim 8, wherein the extension pipe extends through the opening of the outer case body.

11. The engine device of claim 8, further comprising:
an engine coupled to the urea mixing pipe,
wherein:
the urea mixing pipe is configured to receive the exhaust gas from the engine and to provide the exhaust gas to the SCR case; and
the extension pipe is welded to the inner pipe of the urea mixing pipe.

12. The engine device of claim 11, further comprising:
a diesel particulate filter case coupled to the engine and the urea mixing pipe, the diesel particulate filter case configured to receive the exhaust gas from the engine and to provide the exhaust gas to the urea mixing pipe; and
a tailpipe coupled to an outlet of the SCR case.

13. An engine device comprising:
a urea mixing pipe configured to inject urea water into an exhaust gas, the urea mixing pipe having:
an outer pipe defining a channel;
an inner pipe disposed within the channel defined by the outer pipe, the inner pipe comprising an inside surface and an outside surface;
an SCR case configured to remove nitrogen oxides in the exhaust gas, the SCR case comprising:
an outer case body defining a cavity;
an inner case body disposed within the cavity of the outer case body, the inner case body defining an opening;
an SCR inlet pipe having a first end coupled to the outer pipe of the urea mixing pipe and a second end coupled the inner case body of the SCR case; and
an extension pipe coupled to the outside surface of the inner pipe of the urea mixing pipe, wherein at least a portion of extension pipe extends through the opening of the inner case body.

14. The engine device of claim 13 wherein the urea mixing pipe is coupled to the SCR case such that the inner pipe is disposed outside the SCR case.

15. The engine device of claim 14, wherein:
the inner case body of the SCR case comprises an inner surface and an outer surface; and
the second end of the SCR inlet pipe is fixed to the outer surface of the inner case body.

16. The engine device of claim 15, wherein the second end of the SCR inlet pipe is interposed between the outer case body and the inner case body.

17. The engine device of claim 13 further comprising an outlet side lid body coupled to the inner case body, wherein the outlet side lid body defines an outlet opening.

18. The engine device of claim 17, further comprising:
an SCR outlet pipe coupled to the outlet opening.

19. The engine device of claim 13, wherein:
the SCR case further comprises an SCR catalyst and an oxidation catalyst; and
the SCR catalyst and the oxidation catalyst are configured to reduce the nitrogen oxides (NOx) in the exhaust gas.

20. The engine device of claim 13, where the SCR case further comprises:
a temperature sensor coupled to the inner case body; and
a nitrogen oxide sensor coupled to the inner case body.

* * * * *